US010550908B2

(12) United States Patent
Byron

(10) Patent No.: US 10,550,908 B2
(45) Date of Patent: Feb. 4, 2020

(54) END MEMBER ASSEMBLIES AS WELL AS GAS SPRING ASSEMBLIES, SUSPENSION SYSTEMS AND METHODS INCLUDING SAME

(71) Applicant: Firestone Industrial Products Company, LLC, Nashville, TN (US)

(72) Inventor: Matthew F. Byron, Nashville, TN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 87 days.

(21) Appl. No.: 15/559,263

(22) PCT Filed: Mar. 18, 2016

(86) PCT No.: PCT/US2016/023244
§ 371 (c)(1),
(2) Date: Sep. 18, 2017

(87) PCT Pub. No.: WO2016/149660
PCT Pub. Date: Sep. 22, 2016

(65) Prior Publication Data

US 2018/0087592 A1 Mar. 29, 2018

Related U.S. Application Data

(60) Provisional application No. 62/135,156, filed on Mar. 18, 2015.

(51) Int. Cl.
*F16F 9/05* (2006.01)

(52) U.S. Cl.
CPC .................................... *F16F 9/05* (2013.01)

(58) Field of Classification Search
CPC ...... F16F 9/04; F16F 9/05; F16F 9/052; F16F 13/002; B61F 5/01; B61F 5/02; B61F 5/144; B61F 5/22
See application file for complete search history.

(56) References Cited

U.S. PATENT DOCUMENTS 9,555,817 B2 * 1/2017 Jackson, Jr. .............. B61F 5/02
9,834,231 B2 * 12/2017 Jackson, Jr. ........... B21D 53/88
(Continued)

FOREIGN PATENT DOCUMENTS

WO WO 2014/011575 1/2014

OTHER PUBLICATIONS

International Search Report for corresponding PCT Application No. PCT/US2016/023244 dated May 19, 2016.

*Primary Examiner* — Vishal R Sahni
(74) *Attorney, Agent, or Firm* — Brian D. McAlhaney; Matthew P. Dugan

(57) ABSTRACT

End member assemblies that are dimensioned for use in forming a gas spring assembly can include an end member core that is dimensioned for securement to a flexible spring member to at least partially form the gas spring assembly. The end member assemblies can also include a plurality of rib members that are supported on the core body. The plurality of rib members are disposed in spaced relation relative to one another and include an end disposed radially outward beyond the core body. A skirt body can be supported on the core body in operative engagement with the plurality of rib members. The skirt body can include at least one surface operative to engage the flexible spring member. Gas spring assemblies, suspension systems and methods are also included.

20 Claims, 20 Drawing Sheets

(56) References Cited

U.S. PATENT DOCUMENTS

| | | | | |
|---|---|---|---|---|
| 2014/0091548 | A1 | 4/2014 | Ratz et al. | |
| 2014/0175717 | A1 | 6/2014 | Jackson, Jr. | |
| 2014/0239606 | A1* | 8/2014 | Koeske | F16F 9/057 280/124.16 |
| 2017/0307043 | A1* | 10/2017 | Jackson, Jr. | F16F 9/0454 |
| 2018/0023652 | A1* | 1/2018 | Byron | F16F 1/40 267/64.27 |

* cited by examiner

END MEMBER ASSEMBLIES AS WELL AS GAS SPRING ASSEMBLIES, SUSPENSION SYSTEMS AND METHODS INCLUDING SAME

BACKGROUND

The subject matter of the present disclosure broadly relates to the art of spring devices and, more particularly, to end member assemblies that are constructed using modular components such that common components can be used to manufacture end member assemblies of different sizes and/or configurations. Gas spring assemblies including such end member assemblies and suspension systems including one or more of such gas spring assemblies as well as methods of assembly are also included.

The subject matter of the present disclosure is capable of broad application and use in connection with a variety of applications and/or environments. For example, the subject matter of the present disclosure could be used in connection with gas spring assemblies of non-wheeled vehicles, support structures, height adjusting systems and actuators associated with industrial machinery, components thereof and/or other such equipment. In some cases, the subject matter of the present disclosure may find particular application and use in conjunction with rail vehicles, and will be described herein with particular reference thereto. However, it is to be appreciated that the subject matter of the present disclosure is amenable to use in other applications and environments, and that the specific uses shown and described herein are merely exemplary. Accordingly, the subject matter of the present disclosure is not intended to be limited to use associated with gas spring assemblies of suspension systems for wheeled (e.g., rail) vehicles.

Suspension systems, such as may be used in connection with motorized vehicles and/or rolling-stock rail vehicles, for example, can include one or more spring elements for accommodating forces and loads associated with the operation and use of the corresponding apparatus (e.g., motorized vehicle, rail vehicle) to which the suspension system is operatively connected. In such applications, it is often considered desirable to utilize spring elements that operate at a lower spring rate, as a reduced spring rate can favorably influence certain performance characteristics of the apparatus. That is, it is well understood in the art that the use of a spring element having a higher spring rate (i.e. a stiffer spring) will transmit a greater magnitude of inputs (e.g., inputs due to variations in the rails of a track) to the sprung mass of the apparatus and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass but can also, undesirably, permit increased deflection under load.

In some cases, the spring devices can take the form of gas spring assemblies that utilize pressurized gas as the working medium. Gas spring assemblies of various types, kinds and constructions are well known and commonly used. Typical gas spring assemblies can include a flexible spring member that is secured between comparatively rigid end members and/or end member assemblies. The end members or end member assemblies are fixedly secured to a flexible spring member (e.g., a convoluted bellows or an elongated flexible sleeve) such that a substantially fluid-tight spring chamber is formed within the gas spring assembly.

Gas spring assemblies are known to be constructed in a variety of sizes, configurations and arrangements that utilize flexible spring members and end members or end member assemblies of different sizes and/or constructions. In some cases, a given type and/or construction of gas spring assembly may be used in applications that have different size constraints, mounting conditions and/or load requirements. In such cases, multiple variations of the gas spring assembly may be designed, manufactured and sometimes inventoried to meet the demand for these different variations of the gas spring assembly. In many cases, such variations may include numerous common or otherwise substantially identical components. In such situations, however, numerous different versions of those components that are not common to such assemblies are typically manufactured and inventoried for later assembly as one of the variations of gas spring assembly. This can lead to inefficiencies in manufacturing processes as well as increased costs and/or inventory levels.

Notwithstanding the broad usage and overall success of the wide variety of end member assemblies as well as gas spring assemblies and methods that are known in the art, it is believed that a need exists to confront one or more of these competing goals and/or to overcome other disadvantages of known constructions while still retaining comparable or improving factors such as performance, ease of manufacture, ease of assembly, ease of installation and/or reduced cost of manufacture. Thus, it is believed to be generally desirable to develop new constructions and/or designs that may advance the art of spring devices.

BRIEF SUMMARY

One example of an end member assembly in accordance with the subject matter of the present disclosure can have a longitudinal axis and can be dimensioned for securement to an associated flexible spring member to at least partially form an associated gas spring assembly. The end member assembly can include a core body that includes a core wall extending peripherally about the longitudinal axis. The core wall can include an outer mounting surface that is dimensioned to receivingly engage an associated flexible spring member such that a substantially fluid-tight seal can be formed therebetween. A plurality of rib members can be supported on the core body. The plurality of rib members can be disposed in spaced relation relative to one another about the longitudinal axis. The plurality of rib members can include a rib wall extending in a lengthwise direction between a first end disposed along the core body and a second end disposed radially outward beyond the outer mounting surface of the core body. The end member assembly can also include a skirt body disposed along the core body. The skirt body can include a skirt wall with an inner edge, an outer edge disposed radially outward of the inner edge, a first surface disposed in facing relation to the plurality of rib member and a second surface dimensioned to operatively engage the associated flexible spring member.

One example of a gas spring assembly in accordance with the subject matter of the present disclosure can include a flexible spring member having a longitudinal axis. The flexible spring member can include a flexible wall that can extend peripherally about the longitudinal axis and longitudinally between opposing ends to at least partially define a spring chamber. An end member can be secured across one end of the flexible spring member such that a substantially fluid-tight seal is formed therebetween. An end member assembly according to the foregoing paragraph can be secured across the other end of the flexible spring member such that a substantially fluid-tight seal is formed therebetween.

One example of a suspension system in accordance with the subject matter of the present disclosure can include a pressurized gas system including a pressurized gas source and a control device in fluid communication with the pressurized gas source. At least one gas spring assembly in accordance with the foregoing paragraph can be disposed in fluid communication with the pressurized gas source with the control device disposed in fluid communication therebetween.

One example of a method of assembling a gas spring assembly in accordance with the subject matter of the present disclosure and having a longitudinal axis can include providing a core body that includes a core wall extending peripherally about the longitudinal axis. The core wall can include an outer mounting surface dimensioned to receivingly engage an associated flexible spring member such that a substantially fluid-tight seal can be formed therebetween. The method can also include providing a plurality of rib members that have a length and include a rib wall extending in a lengthwise direction between a first end and a second end. The method can further include positioning the plurality of rib member on the core body such that the plurality of rib members are disposed in spaced relation relative to one another about the longitudinal axis with the first end disposed along the core body and a second end disposed radially outward beyond the core body. The method can further include providing a skirt body that can include a skirt wall with an inner edge, an outer edge disposed radially outward of the inner edge, a first surface and a second surface opposite the first surface. The method can also include positioning the skirt body along the core body such that the first surface of the skirt body is disposed in facing relation to the plurality of rib members and the second surface is exposed for operative engagement with the associated flexible spring member.

In some cases, a method of assembling a gas spring assembly in accordance with the foregoing paragraph can further include providing a flexible spring member that has a longitudinal axis. The flexible spring member can include a flexible wall that can extend peripherally about the longitudinal axis and longitudinally between opposing ends to at least partially define a spring chamber. The method can further include securing the end member assembly to the flexible spring member such that a substantially fluid-tight seal is formed along one of the opposing ends.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
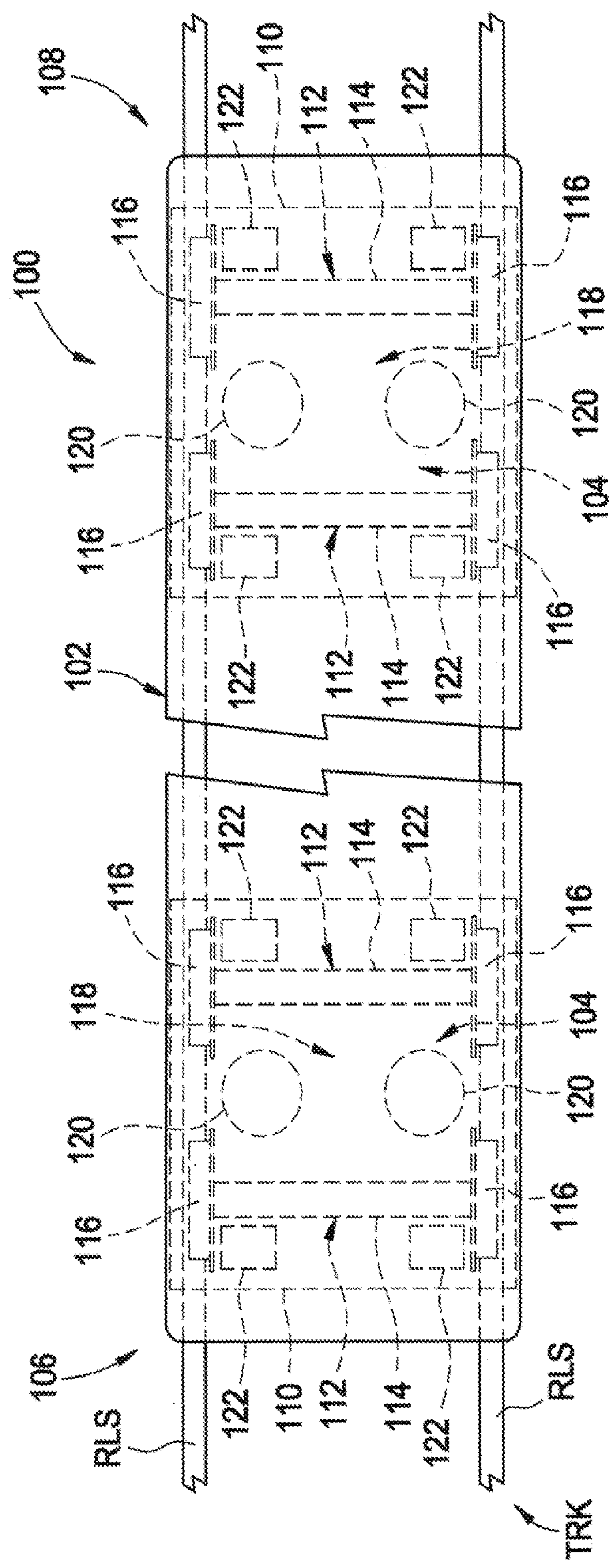
FIG. 1 is a schematic representation of one example of a rail vehicle including a suspension system in accordance with the subject matter of the present disclosure.

FIG. 1 illustrates one example of a vehicle including a suspension system in accordance with the subject matter of the present disclosure, such as a rail vehicle 100 that is adapted for movement or otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction-drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as “trucks,” “rail bogies” or simply “bogies,” and such terms may be used herein in an interchangeable manner. Bogies 104 are shown as being disposed toward opposing ends 106 and 108 of rail vehicle 100.

Bogies 104 are shown in FIG. 1 as including a frame 110 as well as one or more wheel sets 112 that are typically formed by an axle 114 and a pair of spaced-apart wheels 116. Normally, bogies 104 include at least two wheel sets, such as is shown in FIG. 1, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly. In the exemplary arrangement shown in FIGS. 1 and 2, bogies 104 include two gas spring assemblies 120 that are operatively disposed between frame 110 and vehicle body 102 to permit relative movement therebetween.

Rail vehicles, such as rail vehicle 100, for example, typically include a braking system with one or more brakes operatively associated with each wheel set. In the exemplary arrangement in FIG. 1, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 2:
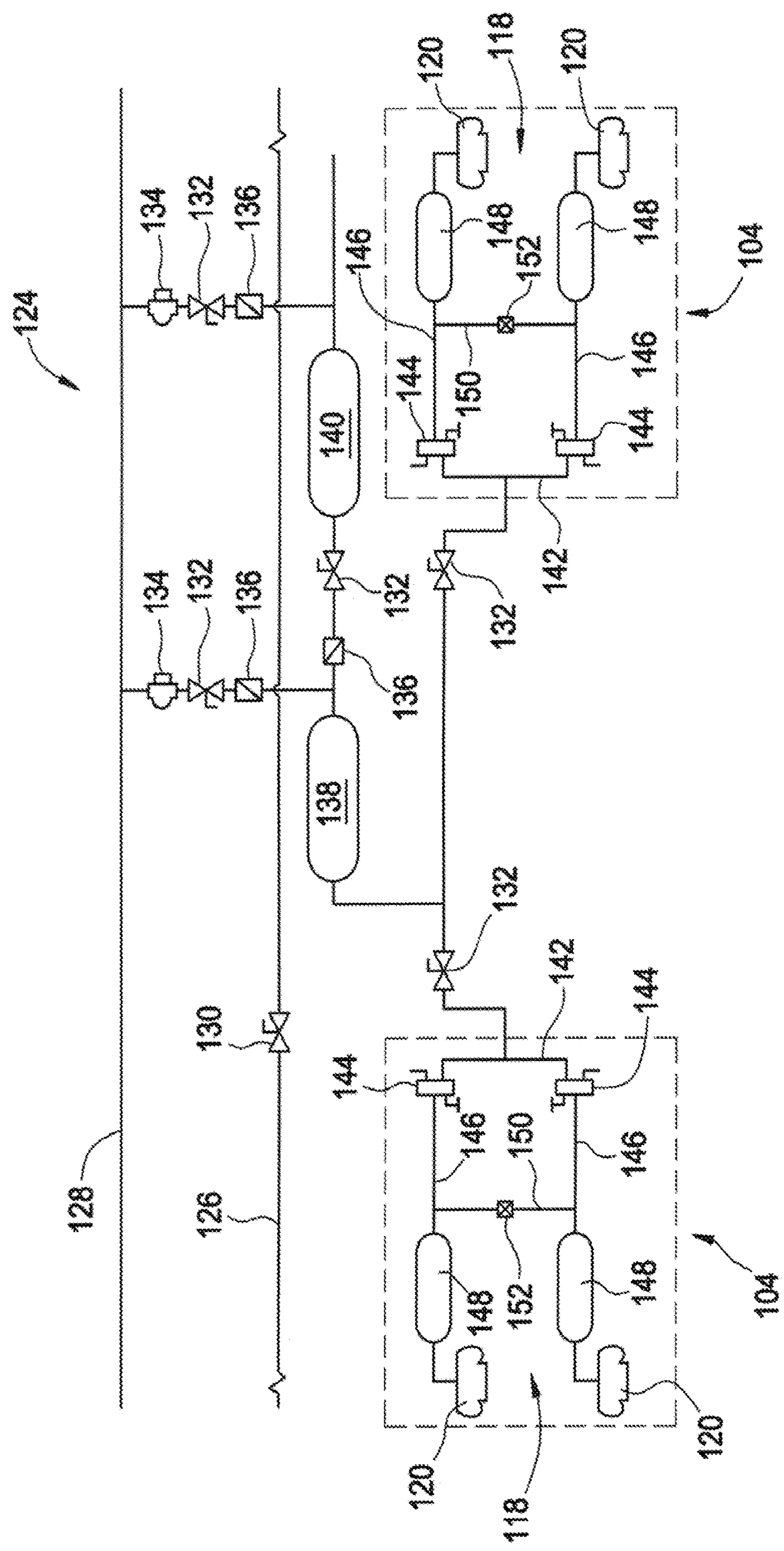
FIG. 2 is a schematic representation of one example of a pneumatic gas system operatively associated with the suspension system in FIG. 1.
Figure 3:
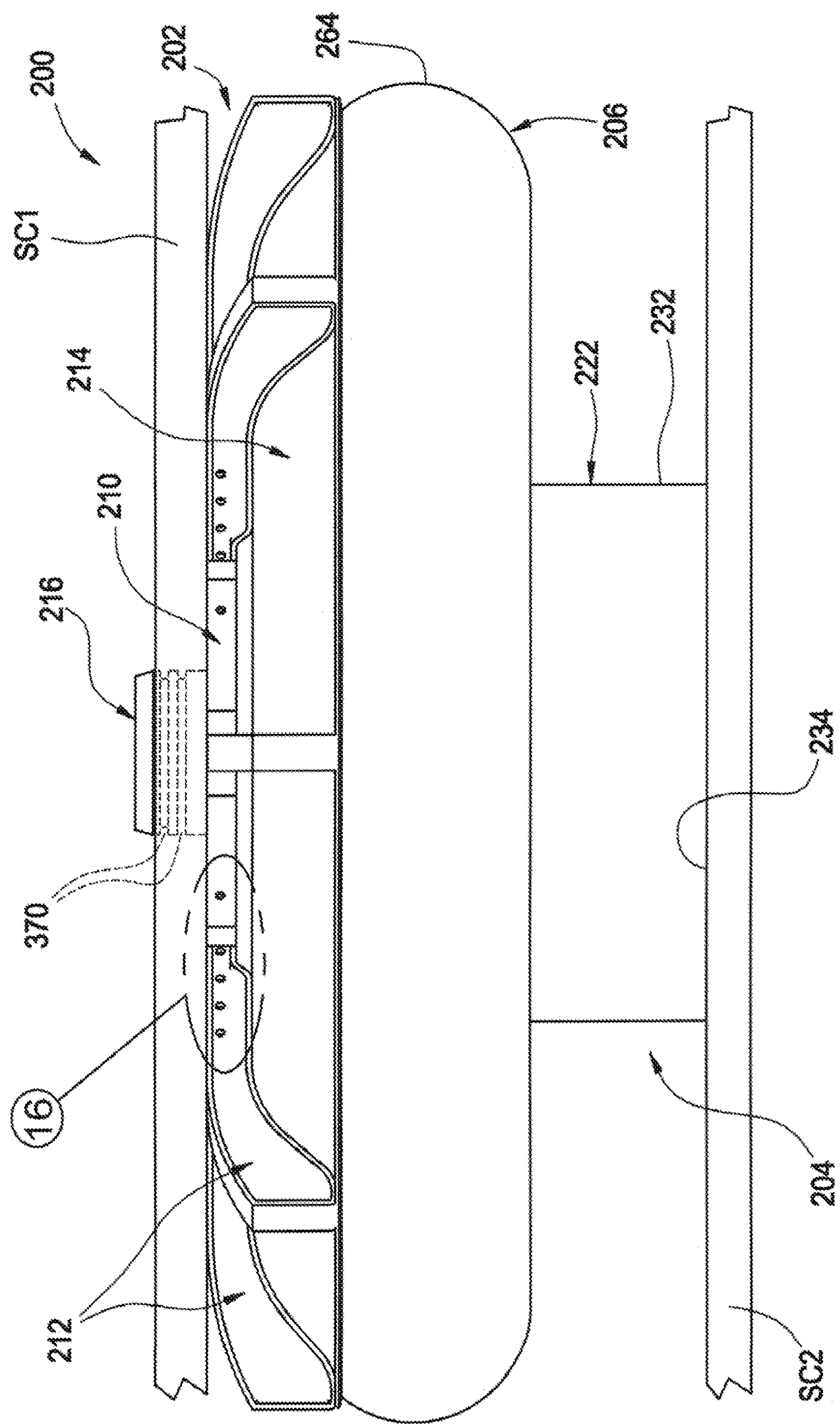
FIG. 3 is a side elevation view of one example of a gas spring assembly including one example of an end member assembly in accordance with the subject matter of the present disclosure.
Figure 4:
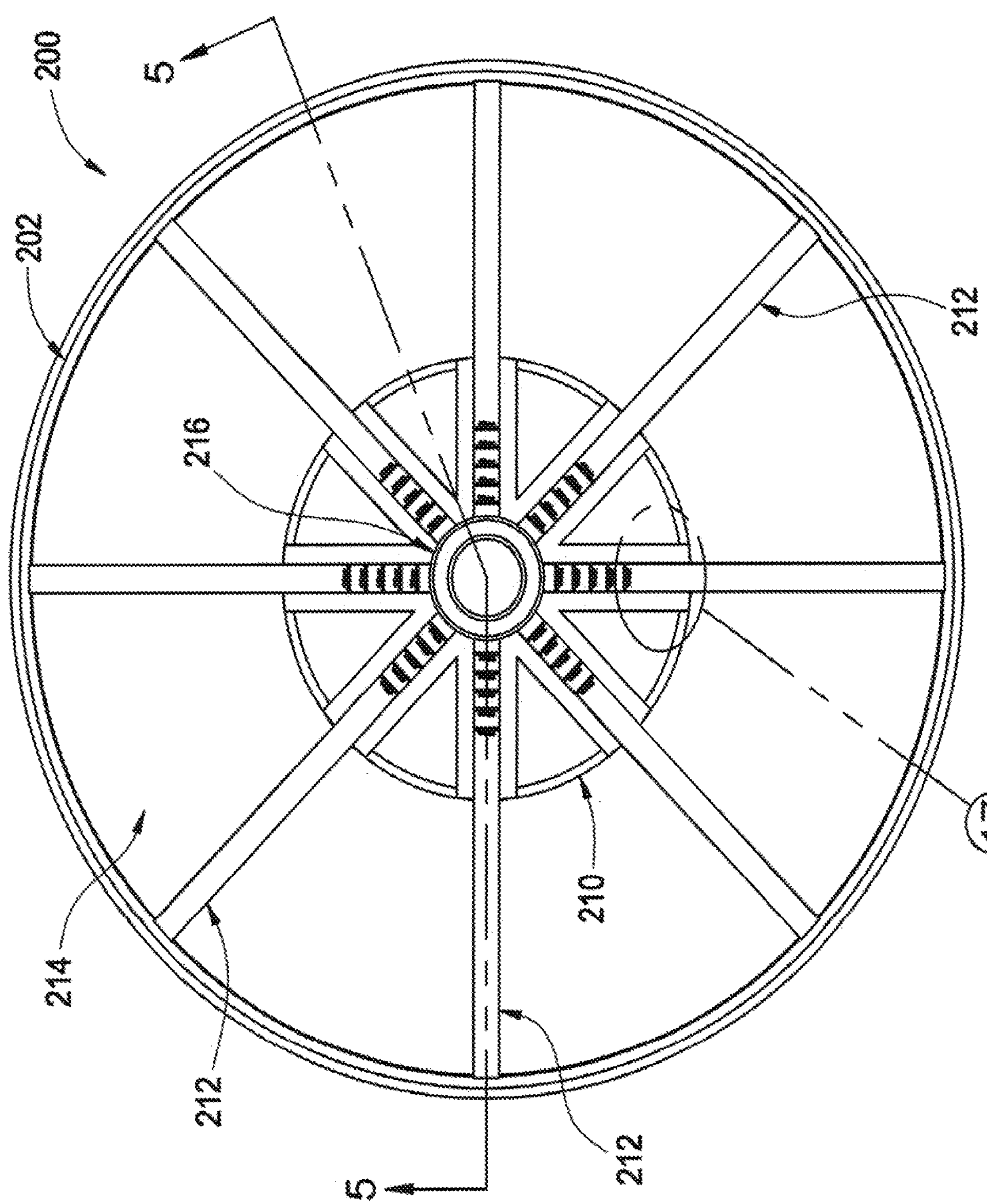
FIG. 4 is a top plan view of the gas spring assembly in FIG. 3.

FIG. 2 illustrates one example of a pneumatic system 124 that is operatively associated with rail vehicle 100 and includes a braking system (not numbered) with a brake pipe 126 in fluid communication with at least brakes 122 (FIG. 1) and a pneumatic supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 2, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as an auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas line 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 2, for example.

One example of a gas spring assembly in accordance with the subject matter of the present disclosure, such as may be suitable for use as one or more of gas spring assemblies 120 in FIGS. 1 and 2, for example, is shown as gas spring assembly 200 in FIGS. 3-7. The gas spring assembly has a longitudinal axis AX and includes an end member (which may alternately referred to herein as an end member assembly) 202, an end member (which may alternately referred to herein as an end member assembly) 204 spaced longitudinally from end member 202 and a flexible spring member or sleeve 206 that extends peripherally about the longitudinal axis and is secured between the end members to at least partially define a spring chamber 208.

Gas spring assembly 200 can be disposed between associated sprung and unsprung masses of an associated vehicle in any suitable manner. For example, one end member can be operatively connected to an associated sprung mass with the other end member disposed toward and operatively connected to an associated unsprung mass. In the arrangement shown in FIGS. 3-7, for example, end member 202 is secured on or along a structural component SC1, such as an associated vehicle body 102 in FIG. 1, for example, and can be secured thereon in any suitable manner. As another example, end member 204 is secured on or along a structural component SC2, such as an associated rail bogie 104 in FIG. 1, for example, and can be secured thereon in any suitable manner.

In the exemplary arrangement in FIGS. 3-8, 8A and 9, end member assembly 202 is shown as being one example of an end member assembly in accordance with the subject matter of the present disclosure. End member assembly 202 can include a core body 210 and a plurality of rib members 212 that are disposed in operative engagement with the core body. End member assembly 202 can also include a skirt body 214 that can be disposed along core body 210 and can operatively engage one or more of rib members 212. In some cases, core body 210 can include a projection or boss that is integrally formed therewith. In other cases, end member assembly 202 can include a connector fitting 216 that can be operatively disposed on or along core body 210.

As mentioned above, one or more securement devices can be used to secure or otherwise interconnect the end members of the gas spring assembly with corresponding structural components. For example, one or more threaded fasteners (not shown) and/or other features (not shown) could operatively secure the end member to the associated structural component. Additionally, or in the alternative, connector fitting 216 can include an outer surface 218 (FIGS. 5 and 6) that is dimensioned for receipt within a passage or mounting hole MHL that extends into or through structural component SC1. Additionally, one or more sealing elements 220 can, optionally, be included that are disposed between or otherwise at least partially form a substantially fluid-tight connection between the end member and the structural component, such as between connector fitting 216 and the inside surface (not numbered) of structural component SC1 through which mounting hole MHL extends, for example. In some cases, structural component SC1 can, optionally, at least partially define an external reservoir suitable for storing a quantity of pressurized gas.

End member 204 is shown as taking the form of an assembly that includes a support base or pedestal 222 and a base plate 224 that is secured on or along the pedestal in a suitable manner, such as by way of a flowed-material joint 226, for example. Pedestal 222 extends axially between opposing ends 228 and 230, and includes an outer surface 232 that extends peripherally about axis AX and an end surface 234 that is disposed along end 230 and is dimensioned or otherwise configured for operative engagement with an associated structural component, such as structural component SC2, for example. It will be appreciated that end member 204 can be secured on or along the associated structural component in any suitable manner. As one example, pedestal 222 can include a plurality of securement features 236, such as threaded passages that extend inwardly into the pedestal from along end surface 234, for example. In some cases, a corresponding number of one or more holes or passages HLS can extend through structural component SC2 that are dimensioned for receipt of a securement device 238, such as a threaded fastener, for example. It will be appreciated, however, that other configurations and/or arrangements could alternately be used.

Base plate 224 can have a plate wall 240 that has opposing surfaces 242 and 244 such that a plate height (not identified) is at least partially defined therebetween. Base plate 224 is shown as being generally planar and extending outwardly to an outer periphery 246. In some cases, base plate 224 can have a generally circular shape such that an outer peripheral surface 248 extending in a heightwise direction can have a generally cylindrical shape. Additionally, in some cases, base plate 224 can, optionally, include an endless annular recess or groove 250 that extends axially inwardly into the base plate from along surface 242 thereof. It will be appreciated that such a groove, if provided, can be of any suitable size, shape, configuration and/or arrangement. For example, groove 250 is shown as being at least partially defined by a bottom surface 252, an inner side surface 254 and an outer side surface 256. In a preferred arrangement, groove 250 can be dimensioned to at least partially receive a portion of flexible spring member 206 and one or more retaining elements, such as may be used to secure the flexible spring member on or along the base plate, for example.

Flexible spring member 206 can be of any suitable size, shape, construction and/or configuration. As one example, flexible spring member 206 can include a flexible wall 258 that extends in a longitudinal direction between opposing ends 260 and 262. It will be appreciated that flexible spring member 206 and flexible wall 258 thereof can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

As shown in FIGS. 3-7, for example, flexible wall 258 can include an outer surface 264 and an inner surface 266 that can at least partially define spring chamber 208. Additionally, as identified in FIG. 7, flexible wall 258 can include an outer or cover ply 268 that at least partially forms outer surface 264 and an inner or liner ply 270 that at least partially forms inner surface 266. In a preferred arrangement, flexible wall 258 can also include one or more reinforcing plies disposed between outer and inner surfaces 264 and 266. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization or another curing process, for example.

Figure 6:
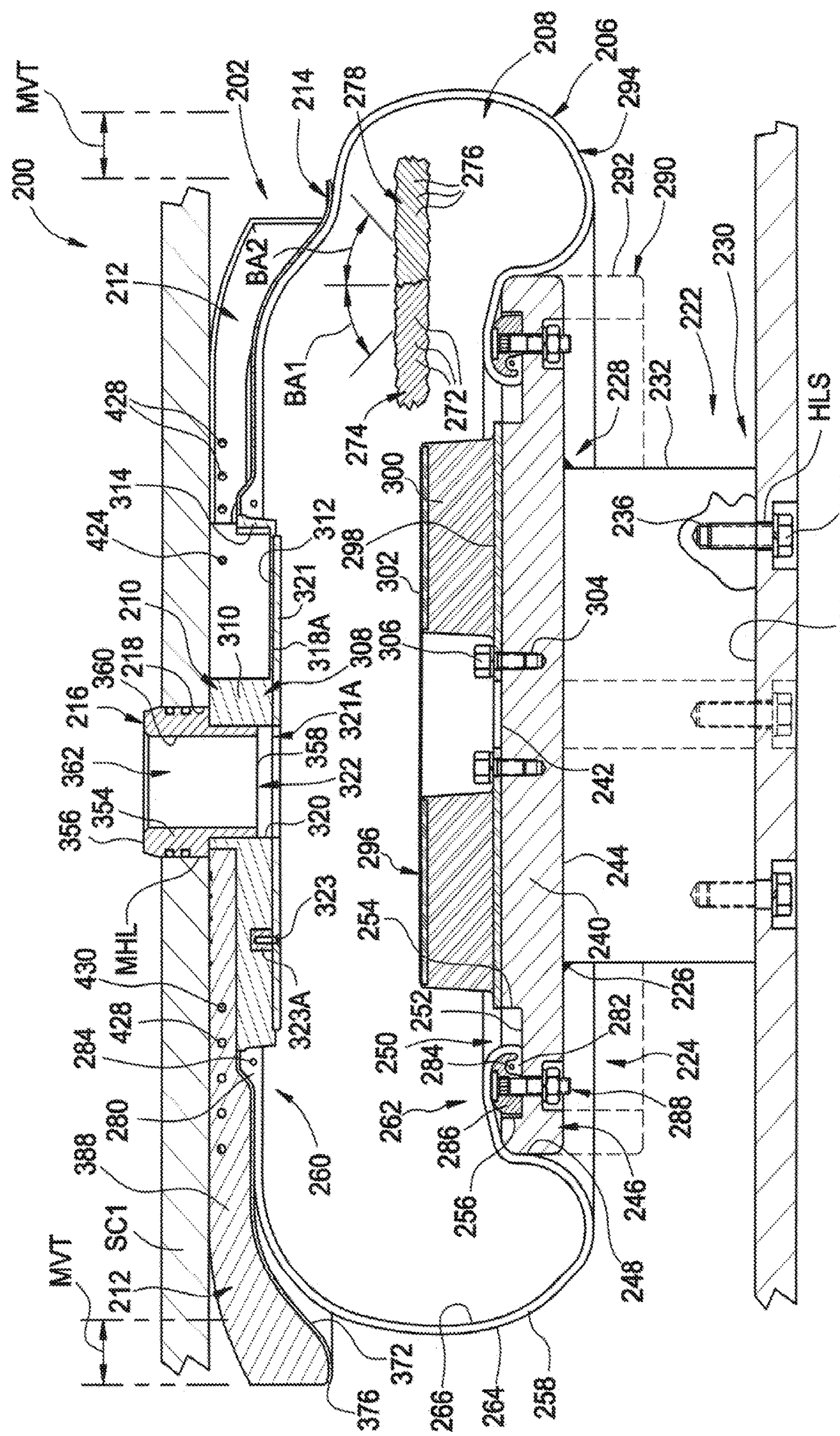
FIG. 6 is a cross-sectional side view of the gas spring assembly in FIGS. 3-5 shown in a second condition of use.
Figure 7:
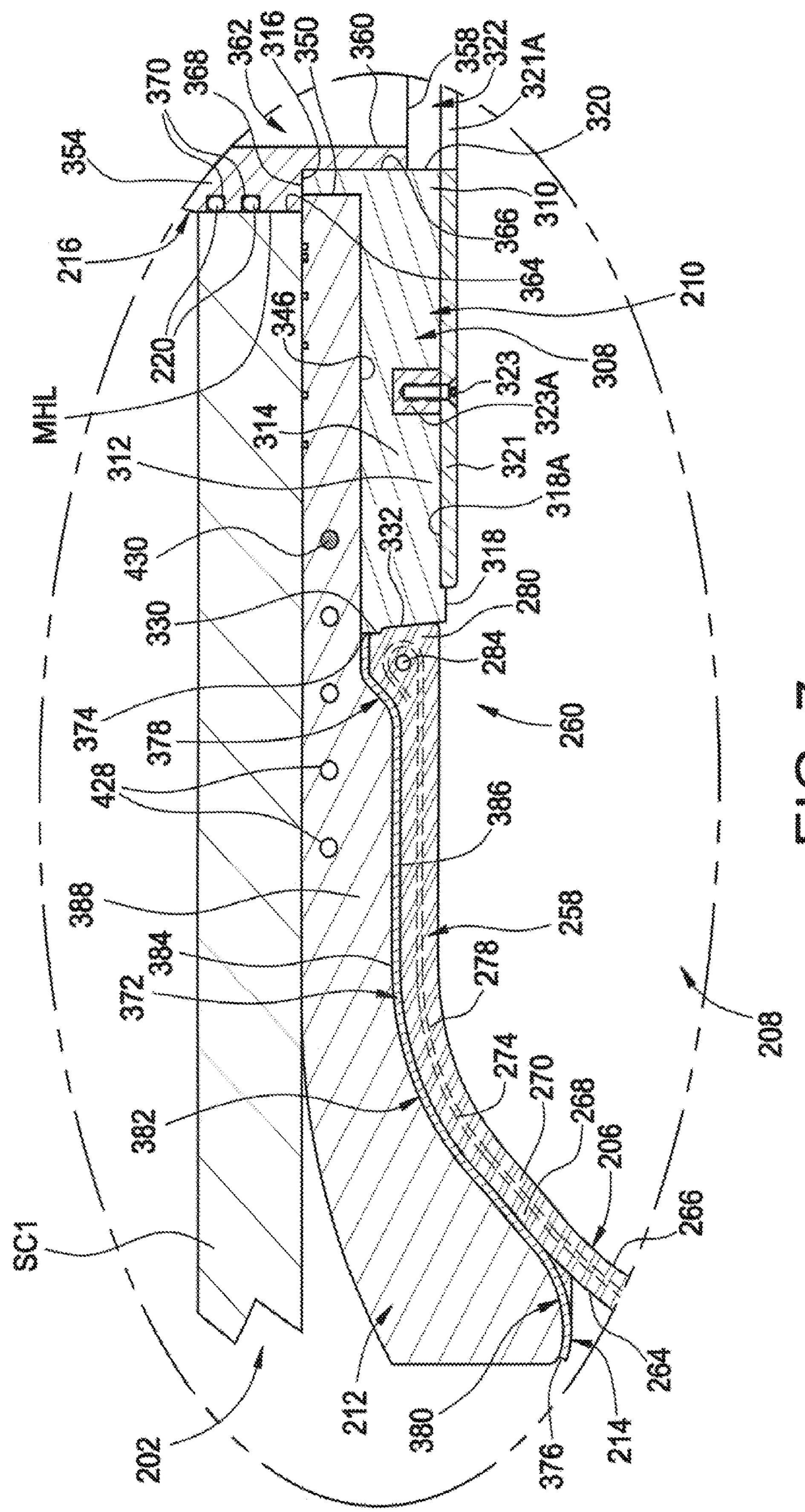
FIG. 7 is an enlarged view of the portion of the gas spring assembly in FIGS. 3-6 that is identified as Detail 7 in FIG. 5.
Figure 8:
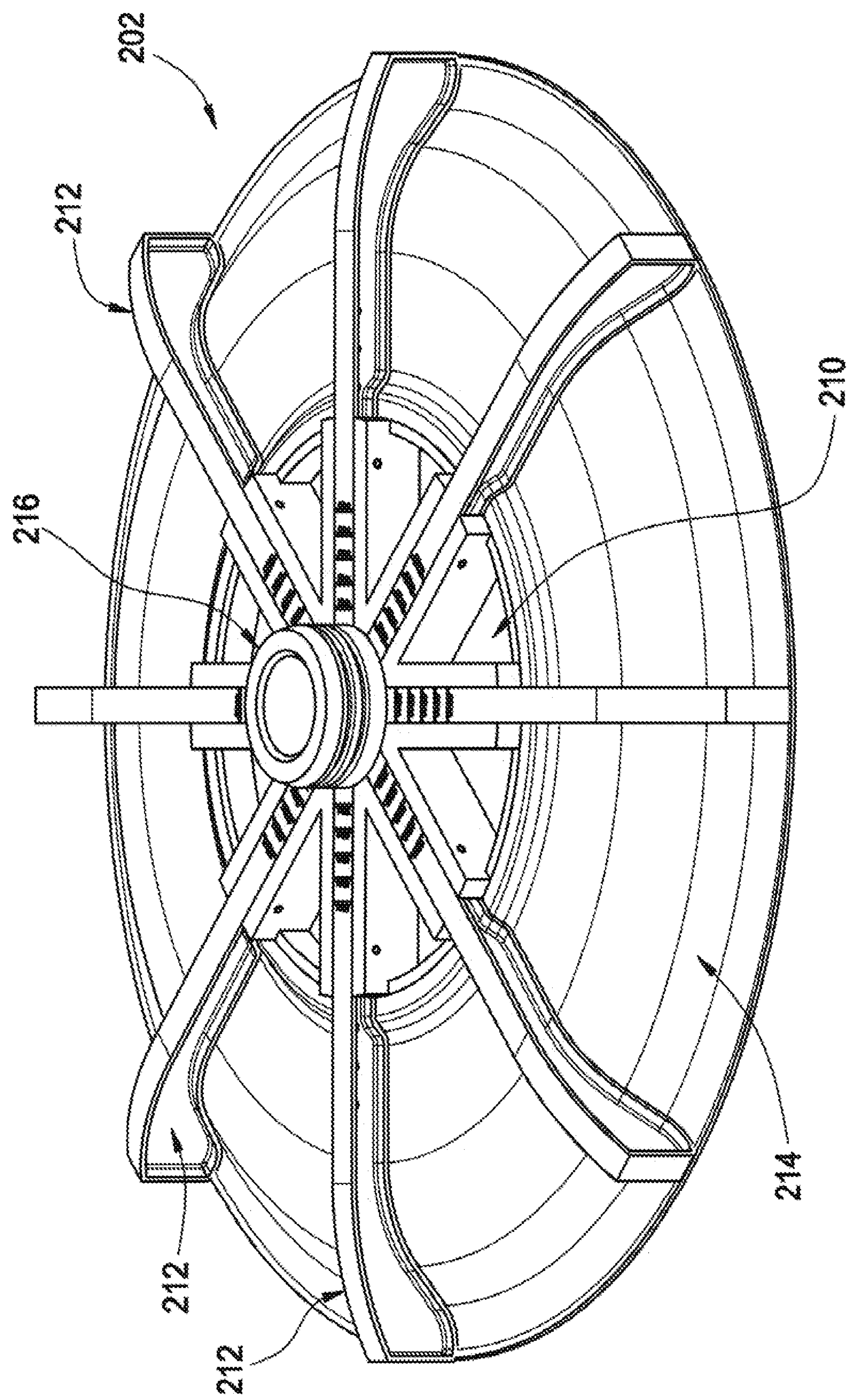
FIG. 8 is a top perspective view of the exemplary end member assembly shown in FIGS. 3-7.
Figure 8A:
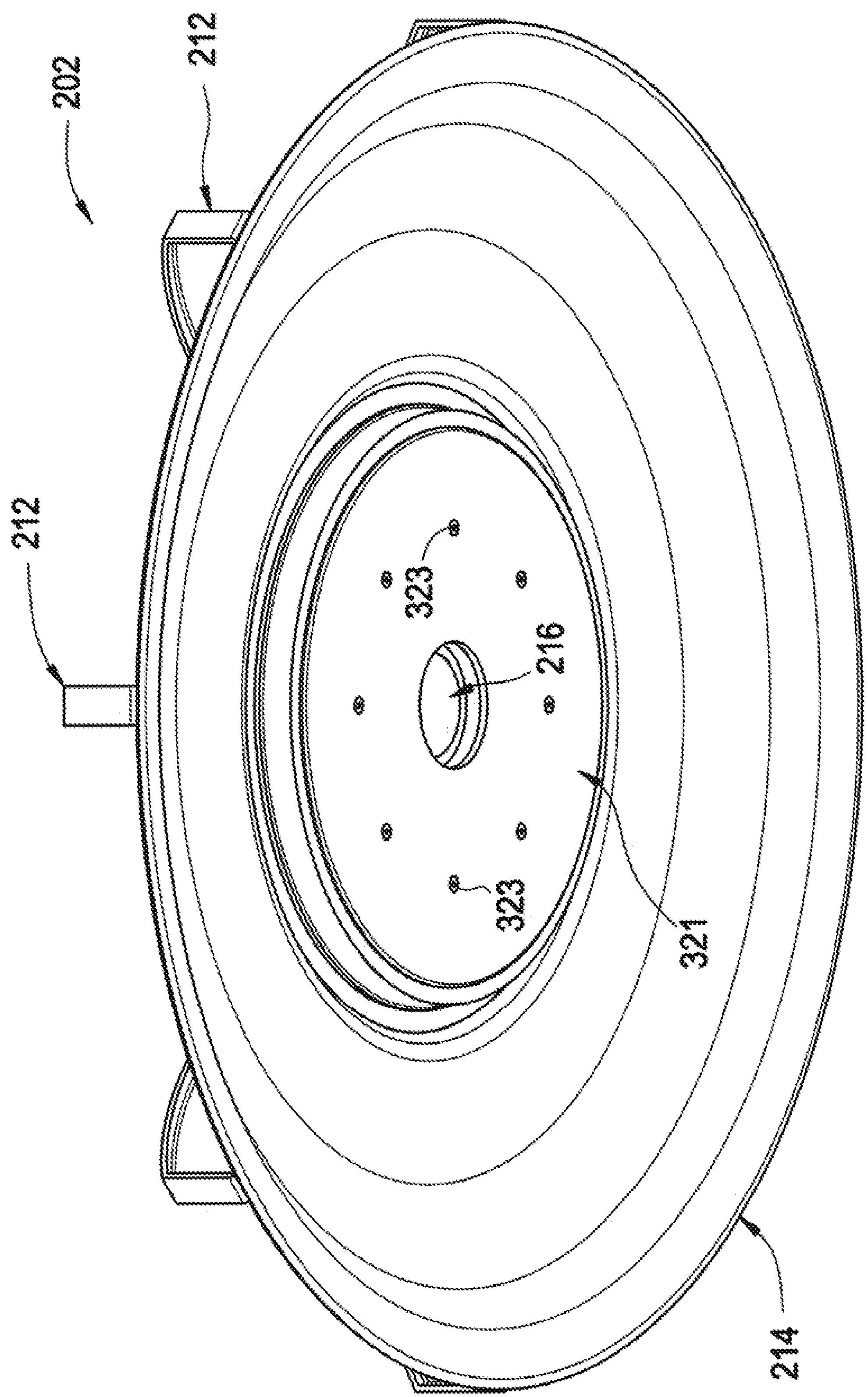
FIG. 8A is a bottom perspective view of the exemplary end member assembly shown in FIGS. 3-8.
Figure 9:
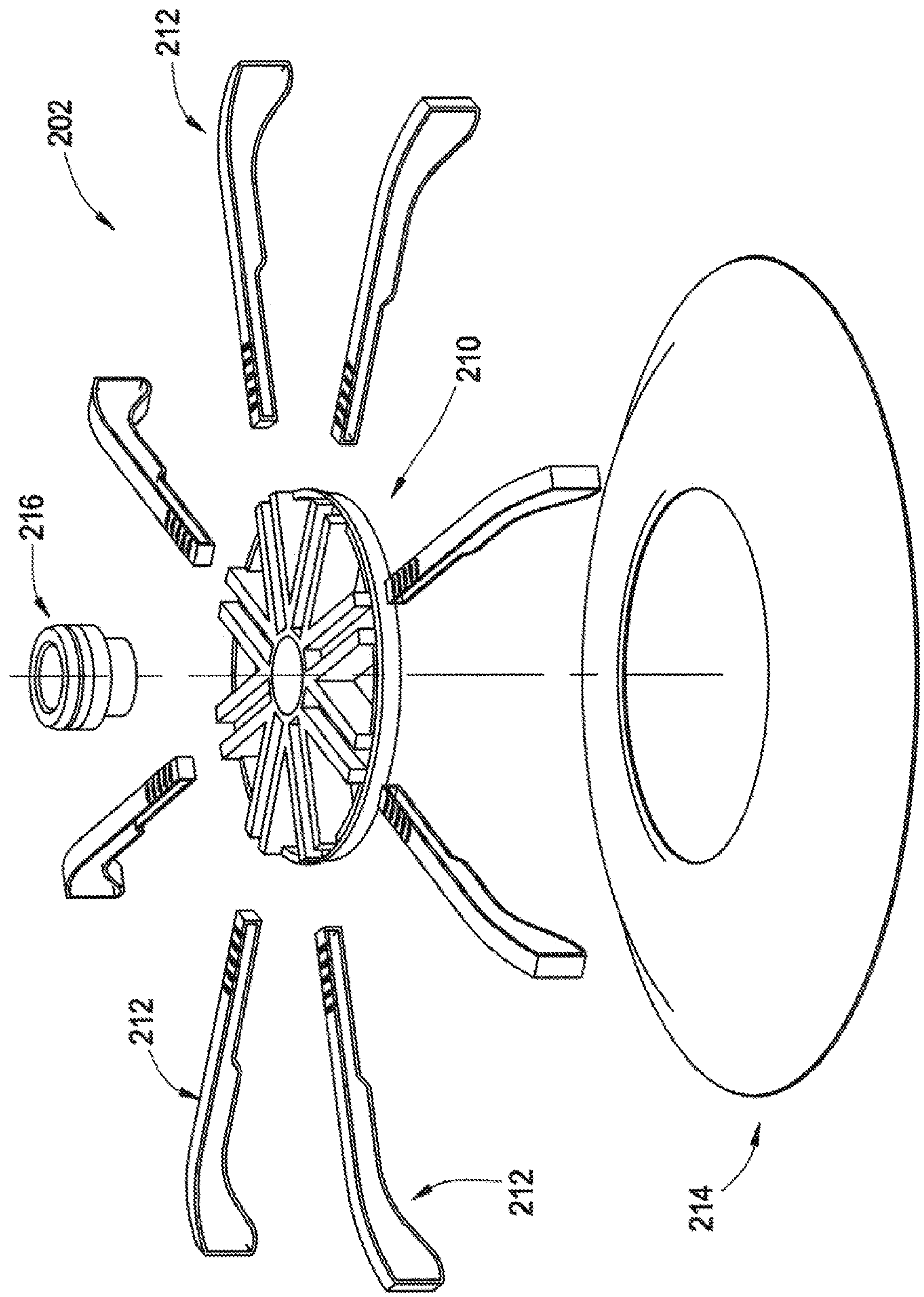
FIG. 9 is an exploded view of the end member assembly in FIGS. 8 and 8A.

Additionally, it will be appreciated that the one or more lengths of filament material, if provided, can be oriented in any suitable manner. As one example, flexible wall 258 is shown in FIG. 6 as including a plurality of filament segments 272 of one reinforcing ply 274 disposed at one bias angle BA1 and a plurality of filament segments 276 of another reinforcing ply 278 disposed at another bias angle BA2. It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 6 by reference dimensions BA1 and BA2, for example.

In some cases, flexible wall 258 can, optionally, include a mounting bead dispose along either one or both of ends 260 and 262. In the arrangement shown in FIGS. 3-7, mounting beads 280 and 282 are shown as being respectively disposed along ends 260 and 262. In some cases, one or more of the mounting beads can, optionally, include a reinforcing element, such as an endless, annular bead core 284, for example, that is at least partially embedded therein and is substantially inextensible in comparison with at least one or more materials of flexible wall 258.

It will be appreciated, that the ends of flexible spring member 206 can be secured on, along or otherwise interconnected between end members 202 and 204 in any suitable manner. As one example, gas spring assembly 200 can include one or more bead retaining elements that engage at least a portion of the flexible spring member and maintain the flexible spring member in substantially fluid-tight engagement with the corresponding end member (e.g., end member 204). In the arrangement shown in FIGS. 5 and 6, end 262 of flexible wall 258 is disposed in abutting engagement with bottom surface 252 of groove 250 in base plate 224. A bead retaining element 286, such as in the form of an endless, annular ring, for example, can capture at least a portion of mounting bead 282 and is shown as being secured on or along base plate 224 by way of a plurality of securement devices 288, such as, for example, threaded fastener (not numbered) and threaded nut (not numbered) combinations that extend through at least approximately aligned holes or slots (not numbered) in the base plate and in the bead retaining element.

Figure 5:
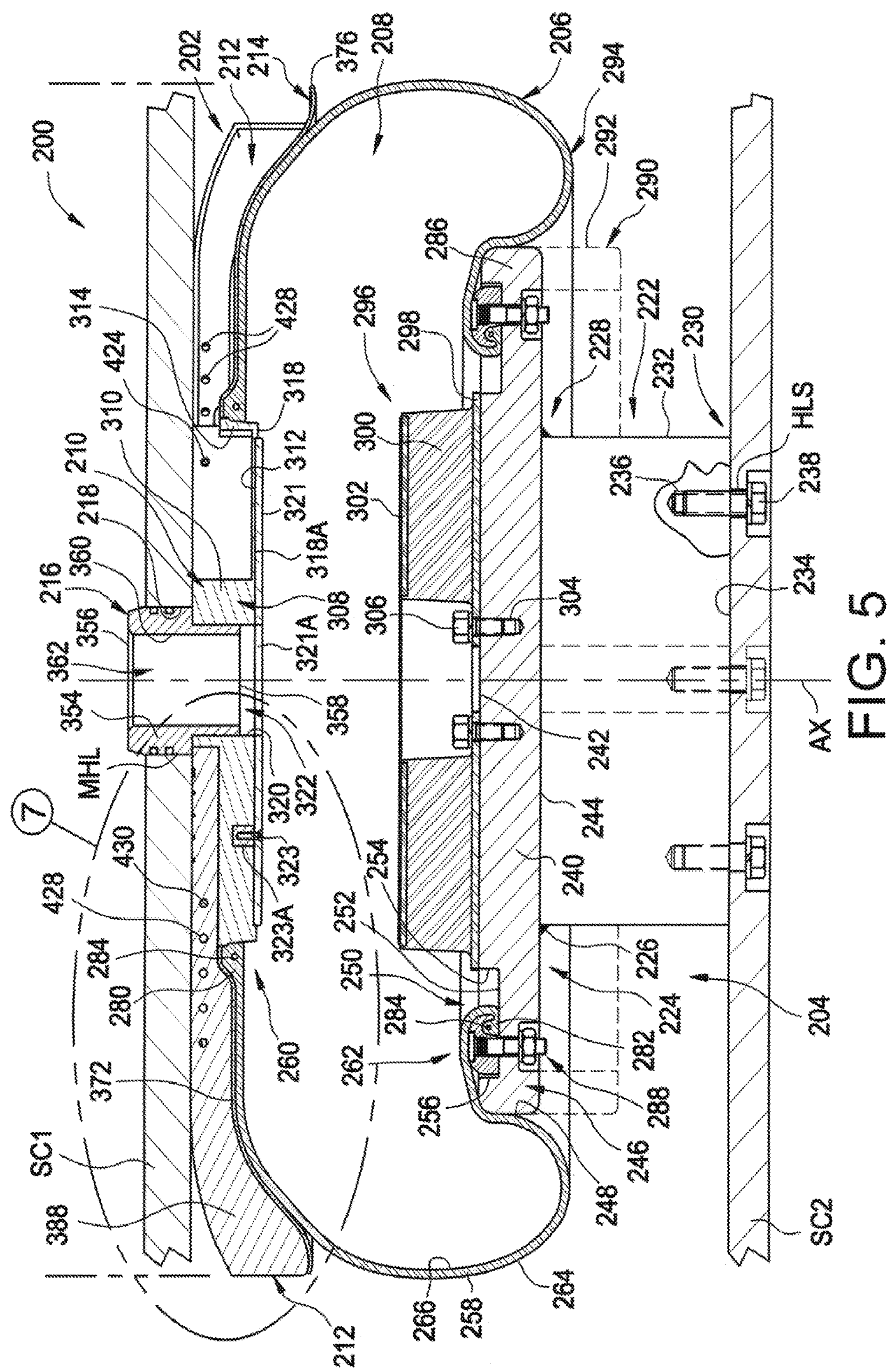
FIG. 5 is a cross-sectional side view of the gas spring assembly in FIGS. 3 and 4 taken from along line 5-5 in in FIG. 4, and shown in a first condition of use.

Typically, at least a portion of flexible spring member 206 will extend radially outward beyond outer periphery 246 of base plate 224. In some cases, end member 204 can include an outer support wall 290 that can, optionally, extend peripherally around or otherwise along base plate 224, such as from along the plate wall of the base plate and in a direction toward end 230 of pedestal 222. In such cases, flexible spring member 206 can extend along an outer surface 292 of outer support wall 290 such that a rolling lobe 294 is formed along the flexible spring member. Outer surface 292 is shown in FIGS. 5 and 6 as having a generally cylindrical shape, and rolling lobe 294 can be displaceable along the outer surface as the gas spring assembly is axially displaced between extended and compressed conditions, such as may occur during dynamic use in operation. It will be appreciated that other shapes and/or configurations of outer support wall 290 and/or outer surface 292 can alternately be used, such as may be useful to provide desired performance characteristics, for example.

As is well known in the art, it is generally desirable to avoid or at least minimize contact between end members of a gas spring assembly, such as may occur due to variations in load conditions and/or upon deflation of the gas spring assembly, for example. Additionally, or in the alternative, it may be desirable to support a sprung mass (e.g., vehicle body 102) at a predetermined height or distance (or within a predetermined range of heights or distances) relative to the unsprung mass (e.g., bogies 104) during uninflated, underinflated or other such condition of the gas spring assembly. As such, gas spring assembly 200 is shown as including a jounce bumper 296 that is disposed within spring chamber 208 and supported on end member 204. As identified in FIGS. 5 and 6, jounce bumper 296 is shown as including a mounting plate 298 that is disposed in abutting engagement with end member 204, a bumper body 300 supported on the mounting plate, and a wear or slide plate 302 that is supported on, and in some cases at least partially embedded or otherwise received within, bumper body 300.

It will be appreciated that jounce bumper 296 can be secured on or along an end member in any suitable manner. As identified in FIGS. 5 and 6, for example, base plate 224 of end member 204 is shown as including one or more securement features 304, such as may take the form of a plurality of threaded holes, for example. In such case, a corresponding number of one or more securement devices 306, such as one or more threaded fasteners, for example, can extend through one of a corresponding number of holes, openings or other features of the jounce bumper or a component thereof (e.g., mounting plate 298) to secure the jounce bumper on or along the end member.

End member assembly 202 is shown in FIGS. 3-8, 8A and 9 as including core body 210 that includes a core wall 308. It will be appreciated that core body 210 and core wall 308 thereof can include any suitable number of one or more walls and/or wall portions. Furthermore, it will be appreciated that the one or more walls and/or wall portions can be formed from any suitable material or combination of materials, such as metal materials (e.g., steel, aluminum) and/or polymeric materials (e.g., polyethylene, polyurethane and/or polyamide).

Figure 10:
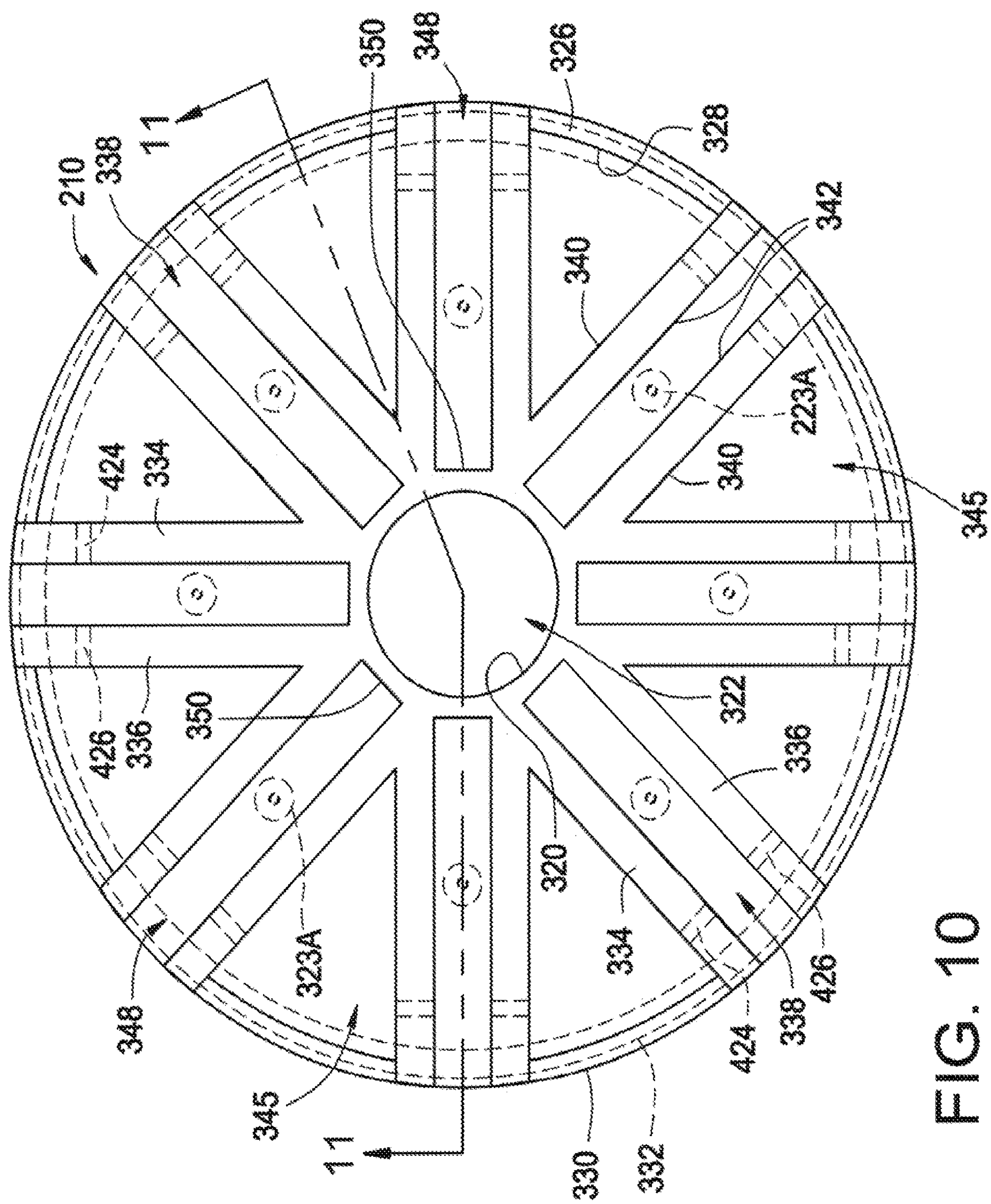
FIG. 10 is a top plan view of an exemplary core member of the end member assembly in FIGS. 3-8, 8A and 9.
Figure 11:
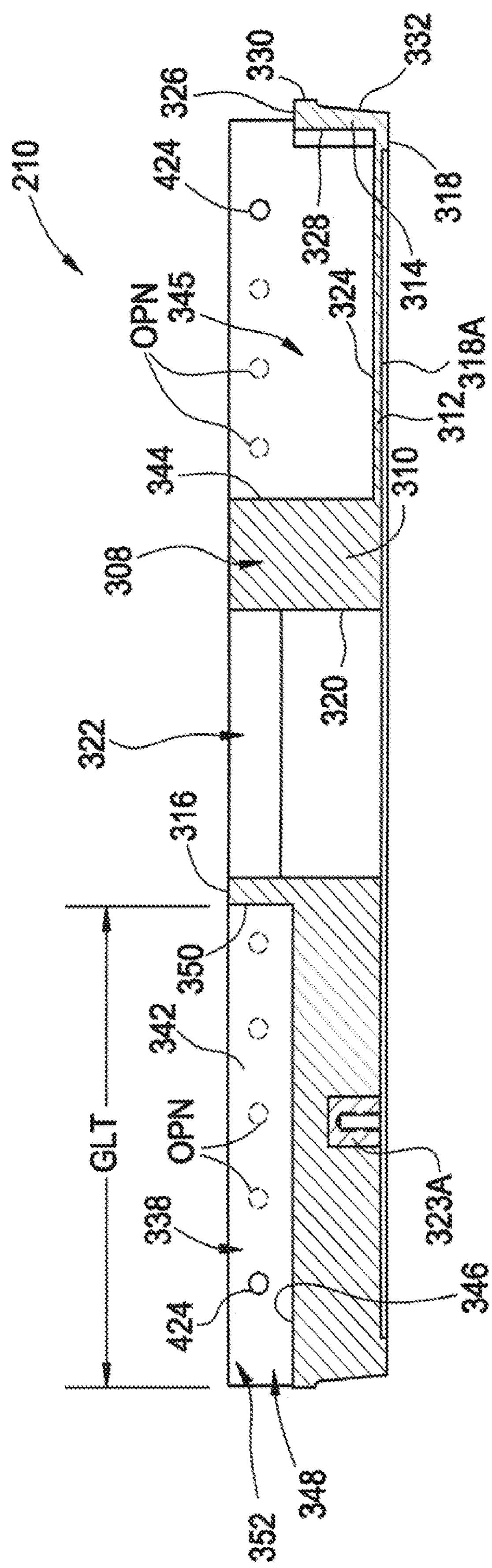
FIG. 11 is a cross-sectional side view of the core member in FIG. 10 taken from along line 11-11 thereof.
Figure 12:
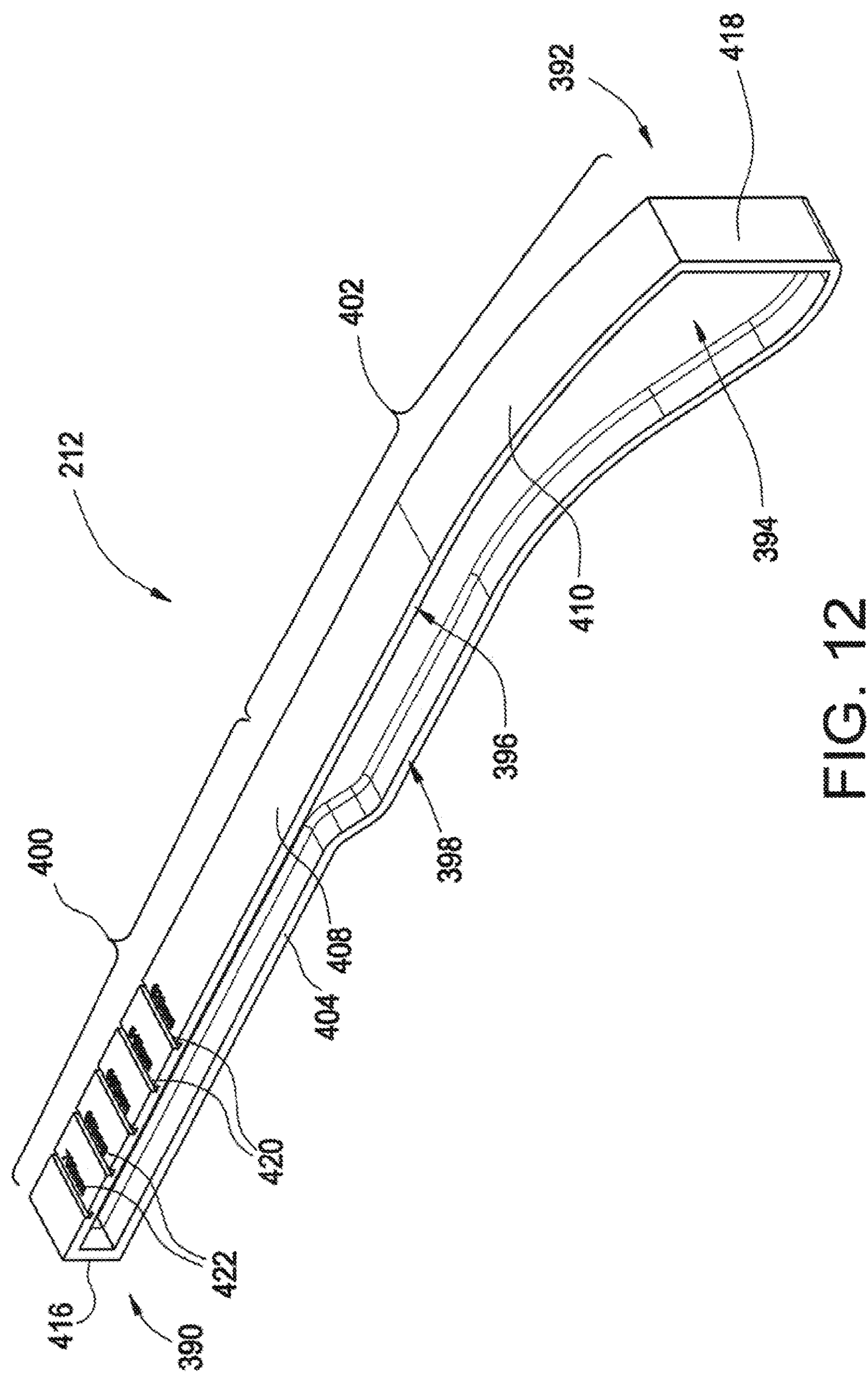
FIG. 12 is a top perspective view of an exemplary rib member of the end member assembly in FIGS. 3-8, 8A and 9.
Figure 13:
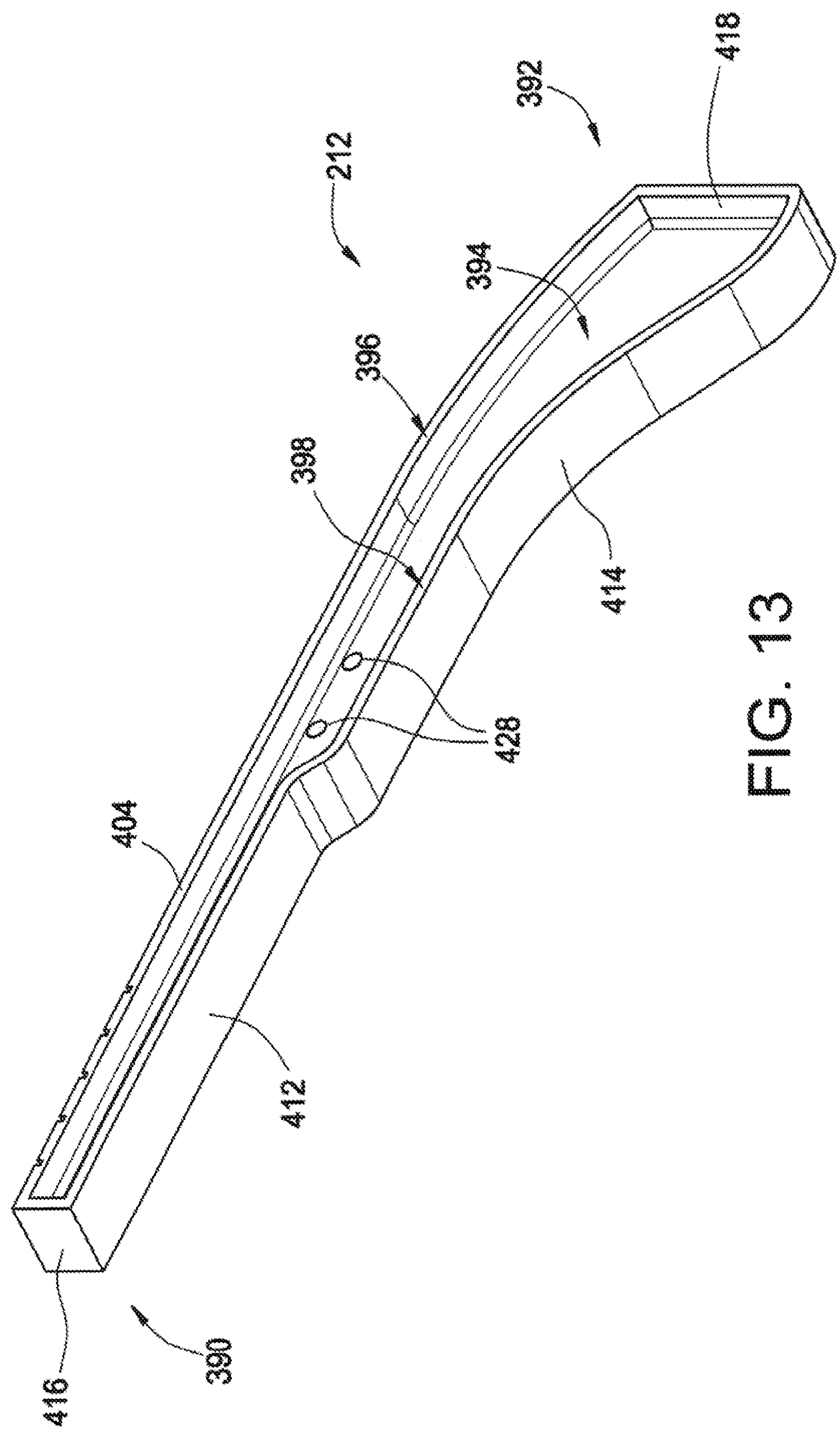
FIG. 13 is a bottom perspective view of the rib member in FIG. 12.
Figure 14:
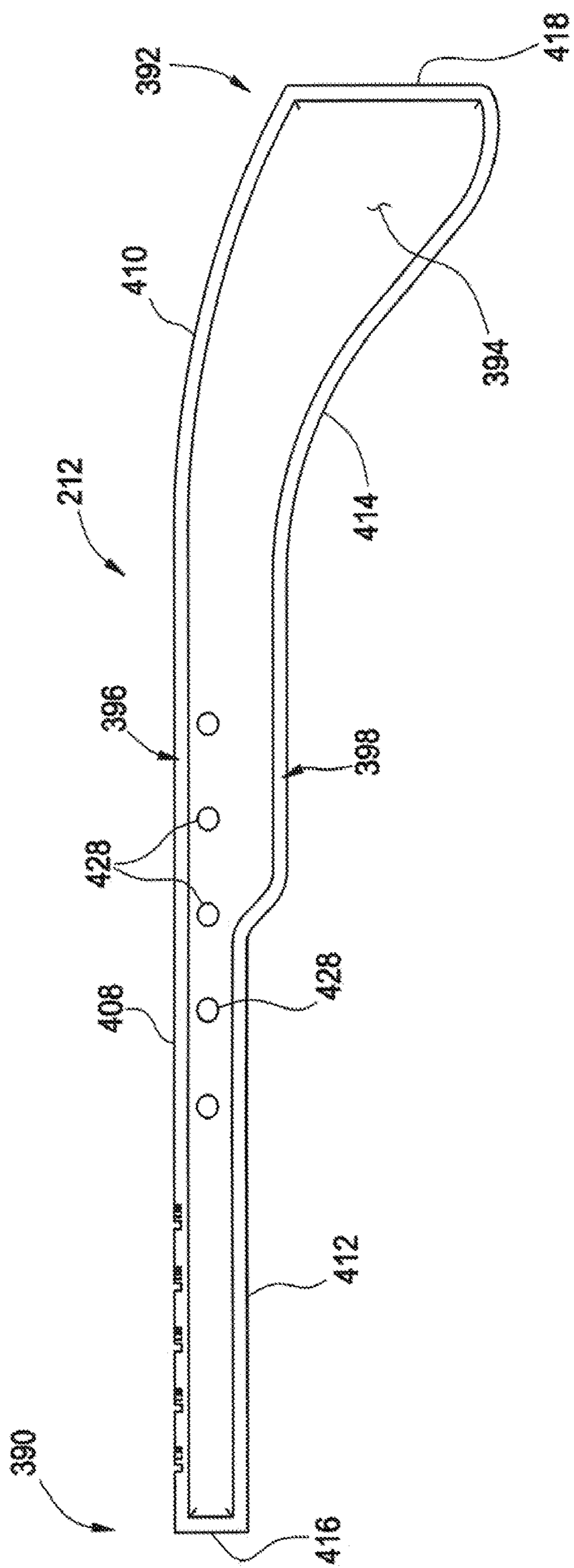
FIG. 14 is a side elevation view of the rib member in FIGS. 12 and 13.
Figure 15:
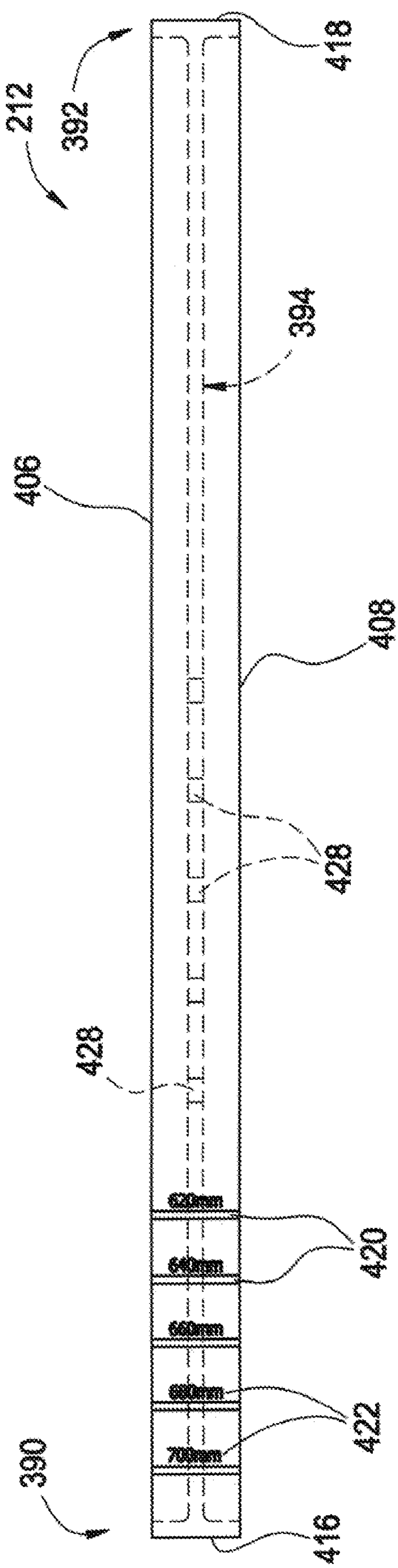
FIG. 15 is a top plan view of the rib member in FIGS. 12-14.
Figure 16:
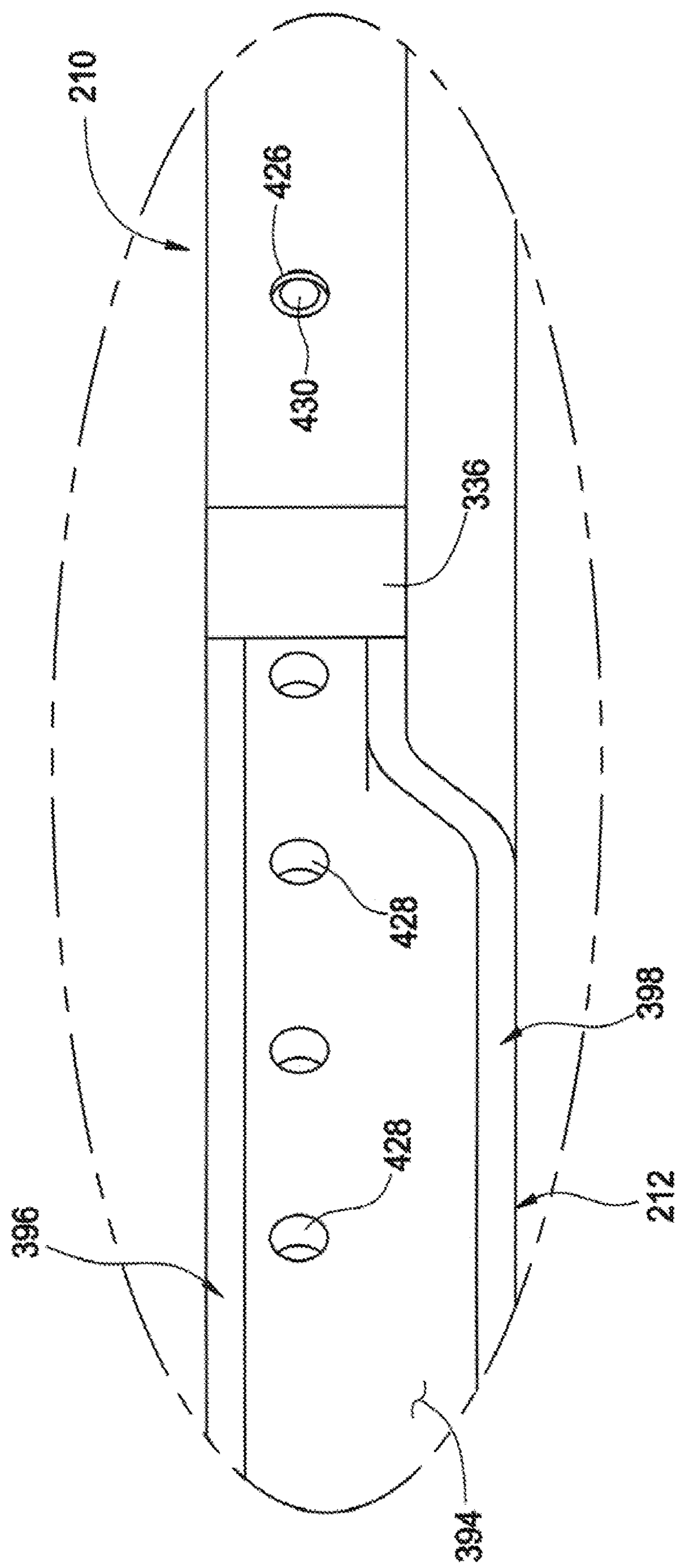
FIG. 16 is an enlarged view of the portion of the end member assembly in FIGS. 3-8, 8A and 9 that is identified as Detail 16 in FIG. 3.
Figure 17:
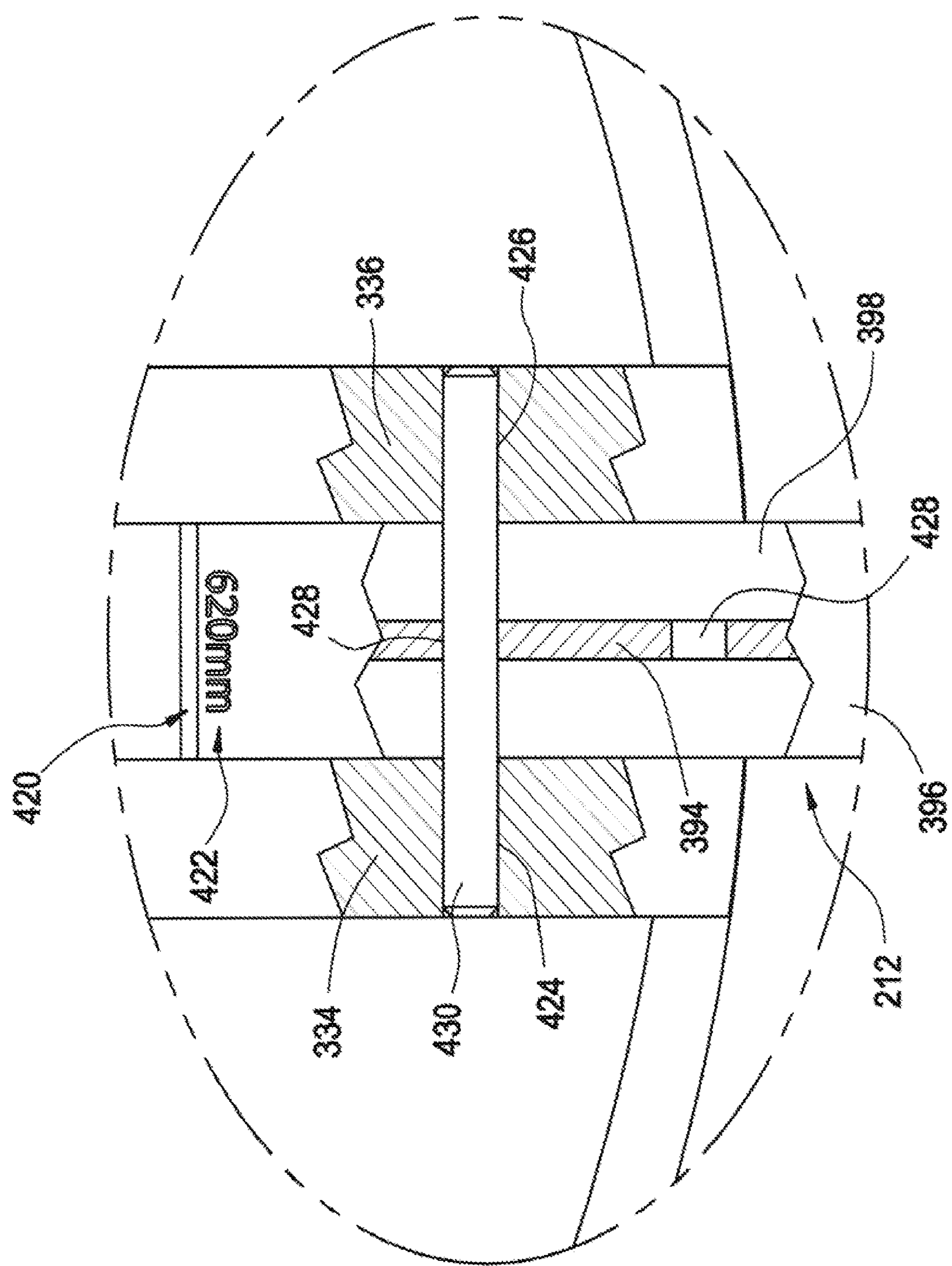
FIG. 17 is an enlarged view, in partial cross section, of the portion of the end member assembly in FIGS. 3-8, 8A and 9 that is identified as Detail 17 in FIG. 4.

As one example, core wall 308 is shown in FIGS. 10 and 11 as including an inner wall portion 310, a base wall portion 312 and an outer peripheral wall portion 314. Inner wall portion 310 extends axially between surfaces 316 and 318. The inner wall portion also includes an inner surface 320 that at least partially defines a passage 322 extending through core body 210. Base wall portion 312 extends radially outward from along inner wall portion 310 and can at least partially form surface 318. In some cases, core body 210 and/or core wall 308 can be constructed such that surface 318 extending along base wall portion 312 can abuttingly engage jounce bumper 296 and/or a component thereof (e.g., wear plate 302).

Gas spring assembly 200 can also, optionally, include one or more additional features and/or that may be dimensioned to or otherwise suitable for abuttingly engaging the jounce bumper or a component thereof (e.g., wear plate 302). In some cases, such features and/or components can be integrally formed on or along one or more components of end member assembly 202, such as surface 318 of core body 210, for example. In other cases, such features and/or components can be provided separately and attached or otherwise secured on or along core body 210 or another component of end member assembly 202. For example, in the arrangement shown in FIGS. 5-7, 8A and 9-11, a wear or slide plate 321 can, optionally, be supported on or along core body 210 in facing relation to bumper body 300 and/or wear or slide plate 302. In some cases, wear or slide plate 321 can include a central opening 321A dimensioned to fluidically communicate with passage 322.

It will be appreciated that wear or slide plate 321 can be disposed on or along core body 210 in any suitable manner. As one example, the wear or slide plate could be disposed in abutting engagement with surface 318 of core wall 308. As another example, core wall 308 can include a recess surface 318A that is offset from surface 318 to at least partially form a recess (not numbered) dimensioned to at least partially receive wear or slide plate 321. It will be appreciated that wear or slide plate 321, if included, can be secured on or along core body 210 in any suitable manner. As one example, wear or slide plate 321 can include a plurality of holes or passages (not numbered) formed therethrough that are dimensioned to receive securement devices 323, such as threaded fasteners, for example. In some cases, securement devices 323 can directly operatively engage the material from which core wall 308 is formed. In other cases, core body 210 can include a plurality of securement inserts 323A that can be at least partially embedded or otherwise received in core wall 308. In such case, securement devices 323 can take the form of threaded fasteners and securement inserts 323A can include threaded passages that are complimentary and dimensioned to receivingly engage the threaded fasteners.

Base wall portion 312 can also include one or more surfaces 324 that face generally opposite surface 318. Outer peripheral wall portion 314 extends axially from along base wall portion 312 to a distal edge surface 326. The outer peripheral wall portion can also include one or more inner surfaces 328 and an outer peripheral surface 330. In some cases, outer peripheral wall portion 314 can also include a mounting surface 332 that is disposed in axially-spaced relation to outer peripheral surface 330. If provided, mounting surface 332 can be dimensioned to receivingly engage an end of the flexible spring member such that a substantially fluid-tight seal is formed therebetween.

As discussed above, it will be appreciated, that the ends of flexible spring member 206 can be secured on, along or otherwise interconnected between end members 202 and 204 in any suitable manner. As mentioned above, for example, gas spring assembly 200 can include one or more bead retaining elements that engage at least a portion of the flexible spring member and maintain the flexible spring member in substantially fluid-tight engagement with the corresponding end member (e.g., end member 202). In some cases, a bead retaining element, such as bead retaining element 286, for example, could be used. Alternately, one or more bead retaining features can be formed on or along another component of the gas spring assembly.

As another alternative, end 260 of flexible spring member 206 can be dimensioned for receipt and retention on or along core wall 308. In the arrangement shown in FIGS. 3-7, for example, mounting bead 280 is dimensioned to abuttingly engage mounting surface 332 of outer peripheral wall portion 314 such that a substantially fluid-tight seal can be formed therebetween. It will be appreciated that end 260 can be assembled onto core body 210 in any suitable manner. As one example, end 260 can be position adjacent the intersection of base wall portion 312 and outer peripheral wall portion 314. End 260 of flexible wall 258 can then be urged, pressed or otherwise forced into abutting engagement with one or more of surfaces 330 and 332 of outer peripheral wall portion 314.

Core wall 308 can also include a plurality of groove or slot wall portions 334 and 336 that together at least partially define a plurality of grooves or slots 338. Groove wall portions 334 and 336 are shown as projecting axially from along base wall portion 312 into approximate alignment with surface 316. Additionally, groove wall portions 334 and 336 extend radially between inner wall portion 310 and outer peripheral wall portion 314. Groove wall portions 334 and 336 are disposed in spaced relation to one another and include opposing surfaces 340 and 342. Surfaces 340 of groove wall portions 334 and 336 together with one or more outer surfaces 344 of inner wall portion 310, one or more surfaces 324 of base wall portion 312 and one or more inner surfaces 328 of outer peripheral wall portion 314 can at least partially form a plurality of recesses 345 within core body 210. Recesses 345 can be disposed in radially-spaced relation to one another between adjacent pairs of groove wall portions 334 and 336.

Grooves 338 can be at least partially formed by surfaces 342 of groove wall portions 334 and 336. In some cases, grooves 338 can also be at least partially defined by one or more bottom surfaces 346. Grooves 338 can extend radially inward from an open end 348 disposed along outer peripheral wall portion 314 to an end surface 350 disposed along inner wall portion 310. As such, grooves 338 can have a groove length extending from end surface 350 in a generally radial direction to an end point, such as may be formed along outer peripheral surface 330 and/or mounting surface 332, as is represented in in FIG. 11 by reference dimension GLT. Grooves 338 are shown in FIGS. 3-11 as including an open side 352 (FIG. 11) that is disposed generally opposite bottom surface 346. As such, it will be appreciated that grooves 338 include groove length GLT, a width (i.e., a distance between surfaces 342 of adjacent groove wall portions 334 and 336) and a height (i.e., a distance between 316 and 346), and are dimensioned to receive at least a portion of one of rib members 212.

As shown in FIGS. 3-8, 8A and 9, connector fitting 216 can include a fitting wall 354 that can include any suitable number of one or more walls and/or wall portions. Furthermore, the one or more walls and/or wall portions of fitting wall 354 can be formed from any suitable material or combination of materials, such as metal materials (e.g., steel, aluminum) and/or polymeric materials (e.g., polyethylene, polyurethane and/or polyamide). Fitting wall 354 is shown as extending longitudinally between end surfaces 356 and 358, and includes an inner surface 360 extending between end surfaces 356 and 358. Inner surface 360 at least partially defines a fitting passage 362 extending through connector fitting 216. Fitting wall 354 also includes an outer surface 364 that has a first cross-sectional dimension (e.g., diameter) and extends from along end surface 356 in a direction toward end surface 358. Fitting wall further includes an outer surface 366 that has a second cross-sectional dimension (e.g., diameter) and extends from along end surface 358 in a direction toward end surface 356. In a preferred arrangement, outer surface 364 is greater than outer surface 366 such that a shoulder surface 368 extends between and operatively interconnects outer surfaces 364 and 366.

Connector fitting 216 can be secured on or along core body 210 in any suitable manner. For example, a flowed-material joint could be formed between the connector fitting and the core body. Additionally, or as alternatives, a pressed-fit or threaded connection could be used to secure the connector fitting on the core body. In this manner, fitting passage 362 can be disposed in fluid communication with passage 322. In a preferred arrangement, outer surface 364 and the inside surface of mounting hole MHL of structural component SC1 are cooperatively dimensioned such that at least a portion of connector fitting 216 can extend into and/or through mounting hole MHL of the structural component. In some cases, one or more annular grooves 370 can extend radially into or otherwise provided along outer surface 364, such as may be dimensioned to receivingly engage sealing elements 220, for example. Additionally, in a preferred arrangement, outer surface 366 and inner surface 320 of passage 322 are cooperatively dimensioned such that a press-fit connection can be formed between the connector fitting and the core body. It will be appreciated, however, that other configurations and/or arrangements could alternately be used for operatively connecting the connector fitting and the core body, such as have been described above, for example.

In an assembled condition, connector fitting 216 can be positioned on or along core body 210 such that outer surface 364 projects radially outward beyond end surface 350 of grooves 338. In such case, shoulder surface 368 can at least partially cover a portion of open side 352 of grooves 338. In a preferred arrangement, shoulder surface 368 can, optionally, be positioned in abutting engagement with at least a portion of surface 316 or otherwise across the top surfaces of groove wall portions 334 and 336. In this manner, shoulder surface 368 together with surfaces 342, 346 and 350 can at least partially form a closed end of grooves 338.

As shown in FIGS. 3-8, 8A and 9, end member assembly 202 includes a lateral support element in the form of skirt body 214, which is supported on or along core body 210 and is dimensioned to operatively engage flexible spring member 206. Generally, lateral support elements are operative to engage a flexible spring member and influence the lateral stiffness rate of the associated gas spring assembly as the same undergoes lateral and/or axial displacement during dynamic use in operation. An example of lateral movement is shown in FIGS. 5 and 6 in which end member assemblies 202 and 204 are shown in FIG. 5 in an approximately coaxial or aligned condition. After undergoing lateral displacement, the end member assemblies are shown in FIG. 6 as being moved in a lateral direction relative to one another into an offset or laterally-shifted condition, which is represented in FIG. 6 by reference arrow MVT. It will be appreciated that lateral support elements with cross-sectional profiles of a variety of shapes, sizes and configurations have been developed and are commonly used, such as may be suitable for contributing to certain performance characteristics of a gas spring assembly. As such, it will be appreciated that a lateral support element (e.g., skirt body 214) having a cross-sectional profile of any suitable size, shape and/or configuration could be used, and that the exemplary arrangement shown in FIGS. 3-8, 8A and 9 is not intended to be limiting.

Additionally, it will be appreciated that a lateral support element (e.g., skirt body 214) can be formed from any suitable number of one or more elements and/or components, and can include any suitable number of one or more walls and/or wall portions. Furthermore, it will be appreciated that the one or more walls and/or wall portions can be formed from any suitable material or combination of materials, such as metal materials (e.g., steel, aluminum) and/or polymeric materials (e.g., polyethylene, polyurethane and/or polyamide).

Skirt body 214 can include a skirt wall 372 that extends between an inner edge or surface 374 and an outer edge or surface 376 that is disposed radially outward of inner edge 374. In some cases, inner edge 374 and outer edge 376 can be axially offset from one another, such as is shown in FIGS. 3-8, 8A and 9, for example. As indicated above, skirt body 214 and skirt wall 372 can include any suitable number of one or more walls and/or wall portions. In the exemplary arrangement shown, skirt wall 372 includes an inner wall portion 378 disposed along inner edge 374, an outer wall portion 380 disposed along outer edge 376 and an intermediate wall portion 382 that extends between and operatively interconnects inner and outer wall portions 378 and 380.

As indicated above, skirt body 214 can be formed from any suitable material or combination of materials. As one example, skirt wall 372 can be formed from a thin-walled material such that opposing surfaces 384 and 386 have an approximately common cross-sectional shape, profile and/or configuration. Surface 384 is oriented in a direction facing away from flexible spring member 206. Surface 386 is disposed in facing relation with the flexible spring member. In alternate constructions, surfaces 384 and 386 may differ in shape, profile and/or configuration from one another. In either case, a desired shape, profile and/or configuration of at least surface 386 can be used to influence the desired performance characteristics of the gas spring assembly, such as has been discussed above.

Skirt body 214 is dimensioned to be supported on or along core body 210 and can be operatively engaged with the core body in any suitable manner. As one example, inner edge 374 and outer peripheral surface 330 are cooperatively dimensioned such that inner wall portion 378 of skirt wall 372 can be disposed on or along outer peripheral wall portion 314 of core wall 308. In such case, inner wall portion 378 can be configured to receive and engage at least a portion of mounting bead 280 formed along end 260 of flexible wall 258 as the mounting bead is seated on or along mounting surface 332. In a preferred arrangement, outer wall portion 380 can be configured to permit flexible wall 258 of flexible spring member 206 to smoothly transition off of and on to surface 386 of skirt wall 372, such as without encountering edges or corners, for example. As indicated above, intermediate wall portion 382 can include one or more different sections with any suitable combination of shapes, profiles and/or configurations for generating or at least contributing to desired performance characteristics of gas spring assembly 200.

With further reference to FIGS. 3-8, 8A and 9, plurality of rib members 212 are operatively engaged with core body 210 such that the core body provides at least orientation, positioning and support to the rib members. Rib members 212 extend outwardly beyond core body 210 and provide support to skirt body 214 as the skirt body experiences forces and loads associated with use of gas spring assembly 200. Rib members 212 are shown as being disposed in spaced relation to one another about axis AX such that support is distributed across the peripheral extent of at least inner wall portion 378 and intermediate wall portion 382 of skirt wall 372. In a preferred arrangement, rib members 212 can be configured to provide support across the peripheral extent of outer wall portion of skirt wall 372 as well.

It will be appreciated that rib members 212 can be formed from any suitable number of one or more elements and/or components, and can include any suitable number of one or more walls and/or wall portions. Furthermore, it will be appreciated that the one or more walls and/or wall portions can be formed from any suitable material or combination of materials, such as metal materials (e.g., steel, aluminum) and/or polymeric materials (e.g., polyethylene, polyurethane and/or polyamide). As shown in FIGS. 12-19, rib members 212 include a rib member wall 388, and extend lengthwise between a proximal end 390 and a distal end 392. Rib members 212 are shown as having a cross-sectional shape approximating an I-beam such that rib member wall 388 includes a web wall portion 394 extending between and operatively connecting flange wall portions 396 and 398, all of which can be integrally formed with one another, such as by being molded or otherwise formed from a thermoplastic material, for example. It will be appreciated, however, that other configurations and/or constructions could alternately be used.

Rib members 212 include a mounting portion or section 400 disposed toward proximal end 390 and a support portion or section 402 disposed toward distal end 392. In an installed condition, mounting section 400 can be disposed in operative engagement with core body 210 and support section 402 can extend outwardly beyond the core body to buttress or otherwise support skirt body 214. Flange wall portions 396 and 398 are disposed in spaced relation to one another, which can at least partially define a height of the rib members. Additionally, rib member wall 388 includes side surfaces 404 and 406 that extend lengthwise along the rib members in spaced relation to one another to at least partially define a width of the rib members. In a preferred arrangement, mounting section 400 of rib members 212 is dimensioned for receipt within grooves 338. In some cases, mounting section 400 can be dimensioned to be received within the closed end of grooves 338 and thereby engage one or more of surfaces 342, 346 and 368.

Rib members 212 include a mounting surface 408 that is disposed along mounting section 400 of flange wall portion 396, and an exposed surface 410 that is disposed along support section 402 of the rib members. Rib members 212 can also include a mounting surface 412 that is disposed along mounting section 400 of flange wall portion 398, and a support surface 414 disposed along support section 402 of flange wall portion 398. It will be appreciated that mounting surface 412 is dimensioned to abuttingly engage bottom surface 348 of grooves 338. Additionally, it will be appreciated that support surface 414 includes a cross-sectional shape, profile and/or configuration that is cooperative with the cross-sectional shape, profile and/or configuration of at least a portion of skirt body 214. In such case, support surface 414 can abuttingly engage surface 384 of skirt wall 372.

In some cases, rib member wall 388 can include an end wall portion 416 disposed along proximal end 390 and/or an end wall portion 418 disposed along distal end 392. In a preferred arrangement, mounting section 400 has a length that is cooperative with groove length GLT such that support surface 414 is positioned on or along corresponding contours of surface 384 of skirt wall 372. In some cases, rib members 212 may be of an overall size, shape and construction that would be suitable for use with core bodies and/or skirt bodies of a variety of sizes (e.g., having different diameters or other cross-sectional dimensions). In such case, it may be desirable to alter the length of mounting section 400 to better fit the size of the particular combination of core body and skirt body of the end member assembly. As such, a method of assembling an end member assembly in accordance with the subject matter of the present disclosure can include altering the length of one or more rib members (e.g., rib members 212). It will be appreciated that the length of the rib members can be altered in any suitable manner. As one example, one or more geometric indicia 420 and/or one or more symbolic or alphanumeric indicia 422 can be disposed in spaced relation to one another along mounting surface 408 of mounting section 400 of flange wall portion 396. If provided, indicia 420 and/or 422 can correspond to preferred lengths for mounting section 400, such as may correspond to certain predetermined combinations of the core body and the skirt body. In such case, the length of mounting section 400 of a plurality of rib members 212 can be reduced by a desired amount prior to assembly. It will be appreciated, however, that other equivalent techniques could alternately be used.

Rib members 212 can, optionally, be secured or otherwise operatively connected on or along core body 210, such as in a manner suitable for retaining the rib members an approximately fixed position relative to the core body, such as may be useful for handling purposes during assembly and/or installation and/or for providing additional strength or support during use in operation. It will be appreciated that any suitable configuration, arrangement and/or combination of features and/or components can be used. For example, one or more securement devices can extend between and operatively interengage one or more of rib members 212 and core body 210. For example, in some cases, a single securement device can extend between and operatively interengage the core body and a plurality of rib members. In other cases, one or more securement devices can extend between and operative interengage the core body and one of the plurality of rib members.

In a preferred arrangement, at least one hole or opening can extend through the rib members and at least one hole or opening can extend through at least one of the groove wall portions of the core body. In an assembled condition of the rib members on the core body, two or more of the holes can be at least approximately aligned with one another to receive a securement device. For example, in the arrangement shown in FIGS. 3, 5-8 and 9-17, groove wall portions 334 and 336 can each include at least one hole or opening 424 and 426, respectively. Additionally, rib members 212 can include at least one hole or opening 428 extending therethrough, such as through web wall portion 394, for example.

In cases in which rib members 212 are configured for use in assemblies of various sizes, shapes and/or configurations by reducing the length thereof, as discussed in detail above, either one or both of core body 210 and rib members 212 can include a plurality of holes or openings that are spaced apart from one another in a lengthwise direction of the rib members. For example, groove wall portions 334 and 336 can, optionally, include a plurality of holes or openings disposed in spaced relation to one another in the lengthwise direction of the rib members, such as are represented by dashed lines OPN in FIG. 11, for example. Additionally, or in the alternative, rib members 212 can include a plurality of openings 428 disposed in spaced relation to one another in the lengthwise direction of the rib members.

In an assembled condition, at least one of the openings in the rib members preferably are at least approximately aligned with at least one of the openings in one of the groove wall portions of the core body. In which case, at least one securement device can be provided that can extend into and operatively engage the core body and at least one of the plurality of rib members. In a preferred arrangement, a plurality of securement devices 430 can be provided with at least one of securement devices 430 extending between and operatively interengaging core body 210 and one of rib members 212. Securement devices 430 are shown as taking the form of elongated, substantially-cylindrical pins that can be disposed within or otherwise extend through opening 428 and one or more of openings 424 and 426. In some cases, securement devices 430 can be pressed or otherwise friction fit into engagement with at least one of openings 424, 426 and/or 428 such that securement devices 430 are substantially self-retained within the one or more openings.

Figure 18:
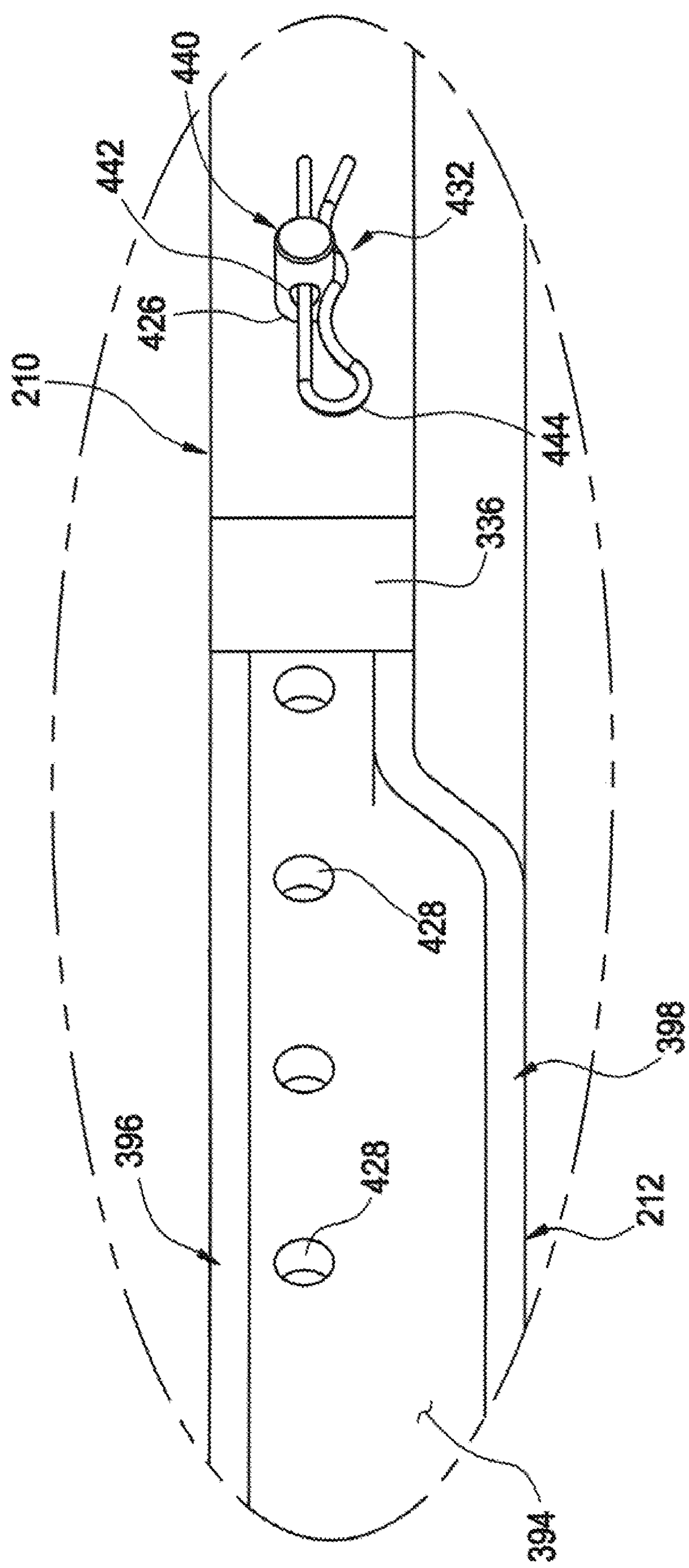
FIG. 18 is an enlarged view of an alternate construction of the portion of the end member assembly shown in FIG. 16.
Figure 19:
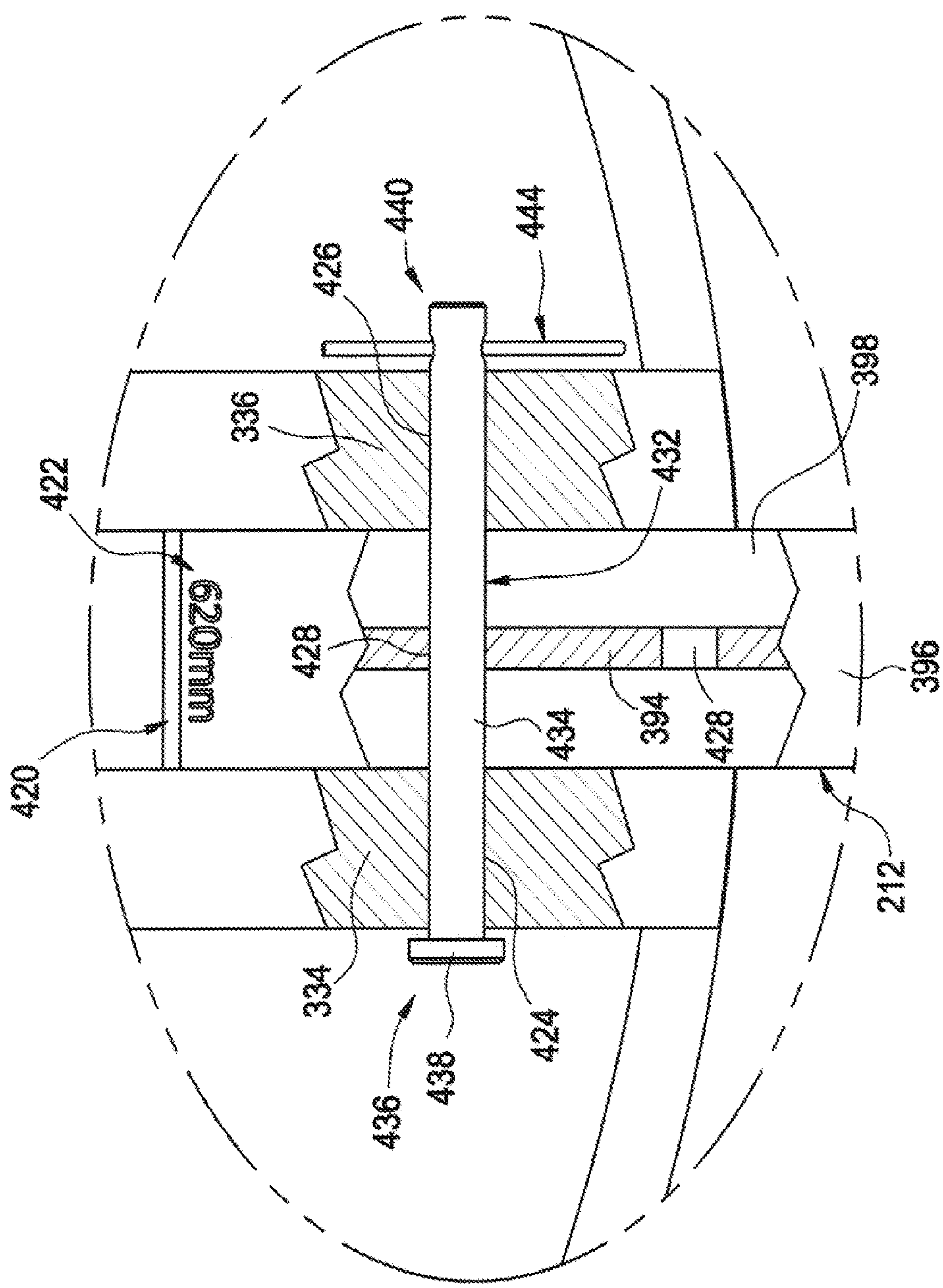
FIG. 19 is an enlarged view, similar to that of FIG. 17, of showing the alternate construction in FIG. 18.

An alternate arrangement is shown in FIGS. 18 and 19 in which a plurality of securement devices 432 are used in place of securement devices 430. It will be appreciated that securement devices 432 differ from securement devices 430 in that securement devices 432 can include an elongated pin portion 434 that extends between an end 436, which includes an enlarged head 438, and an end 440 disposed opposite end 436 in a lengthwise direction. Elongated pin portion 434 can include a passage 442 extending therethrough along end 440 that is oriented transverse to the lengthwise direction of elongated pin 434. A retaining element 444 can extend through passage 442 for retaining elongated pin 434 in operative engagement between core body 210 and rib member 212. In such an arrangement, securement devices 434 can, optionally, form a clearance or transition fit with openings 424, 426 and/or 428 rather than a friction or press fit, as discussed above. It will be appreciated, however, that the foregoing constructions are merely exemplary and that other securement devices, such as threaded fasteners, for example, would alternately be used.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially,"

and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly having a longitudinal axis and dimensioned for use in forming an associated gas spring assembly, said end member assembly comprising:

a core body including a core wall extending peripherally about said longitudinal axis, said core wall including an outer mounting surface dimensioned to receivingly engage an associated flexible spring member such that a substantially fluid-tight seal can be formed therebetween;

a plurality of rib members separate from and assembled onto said core body, said plurality of rib members disposed in spaced relation relative to one another about said longitudinal axis, said plurality of rib members including a rib wall extending in a lengthwise direction between a first end disposed along said core body and a second end disposed radially outward beyond said core body; and, a skirt body separate from said core body and said plurality of rib members, said skirt body disposed along at least said plurality of ribs and including a skirt wall with an inner edge, an outer edge disposed radially outward of said inner edge, a first surface disposed in facing relation to said plurality of rib members and a second surface dimensioned to operatively engage the associated flexible spring member.

2. An end member assembly according to claim 1, wherein said core wall includes a passage surface that at least partially defines a passage extending through said core wall in approximate alignment with said longitudinal axis.

3. An end member assembly according to claim 2 further comprising a connector fitting operatively secured to said core body in fluid communication with said passage.

4. An end member assembly according to claim 1, wherein said rib wall of said plurality of rib members includes a mounting surface portion extending in said lengthwise direction, said mounting surface portion disposed toward said first end of said plurality of rib members with at least some of said mounting surface portion disposed radially inward of said outer mounting surface of said core body.

5. An end member assembly according to claim 1, wherein said core body includes plurality of slots disposed in spaced relation to one another about said longitudinal axis, said plurality of slots dimensioned to receive at least a portion of said first end of one of said plurality of rib members.

6. An end member assembly according to claim 5, wherein said plurality of slots include a bottom surface and opposing side surfaces with an open end formed adjacent said outer mounting surface.

7. An end member assembly according to claim 6, wherein said plurality of slots include an end surface disposed radially inward of said outer mounting surface by a first distance that is less than or approximately equal to a length of a mounting surface portion of said rib wall disposed toward said first end of said plurality of rib members.

8. An end member assembly according to claim 1, wherein said first surface of said skirt body has cross-sectional profile extending between said inner edge and said outer edge of said skirt wall.

9. An end member assembly according to claim 8, wherein said skirt wall is formed from a thin-walled material such that said second surface of said skirt body has a cross-sectional profile that has at least approximately the same shape as said cross-sectional profile of said first surface.

10. An end member assembly according to claim 1, wherein said rib wall of said plurality of rib members includes a support surface portion extending in said lengthwise direction, said support surface portion disposed toward said second end of said plurality of rib members and radially outward of said outer mounting surface of said core body.

11. An end member assembly according to claim 10, wherein said support surface portion of said rib wall of said plurality of rib members is dimensioned to abuttingly engage said first surface of said skirt body.

12. An end member assembly according to claim 1, wherein said rib wall of said plurality of rib members includes an outer surface portion facing away from said skirt body with said plurality of rib members including a plurality of indicia disposed in lengthwise spaced relation to one another toward said first end of said plurality of rib members.

13. An end member assembly according to claim 1 further comprising at least one securement device operatively interconnecting said core body and at least one of said plurality of rib members.

14. An end member assembly according to claim 1 further comprising a plurality of securement devices with at least one of said plurality of securement devices operatively interconnecting one of said plurality of rib members and said core body.

15. An end member assembly according to claim 14, wherein said plurality of rib members include an opening extending therethrough and one of said plurality of securement devices extends through said opening and operatively engages said core body.

16. An end member assembly according to claim 15, wherein said plurality of rib members include a plurality of openings extending therethrough, said plurality of openings disposed in spaced relation to one another in said lengthwise direction.

17. An end member assembly according to claim 1, wherein said core body includes a plurality of groove wall portions that at least partially form at least one elongated groove dimensioned to at least partially receive one of said plurality of rib members.

18. An end member assembly according to claim 17 further comprising at least one securement device operatively interconnecting said one of said plurality of rib members and at least one of said plurality of groove wall portions.

19. A gas spring assembly comprising:

an end member assembly according to claim 1;

an end member disposed in longitudinally spaced relation to said end member assembly; and, a flexible spring member including a flexible wall extending peripherally about said axis and longitudinally between opposing first and second ends to at least partially define a spring chamber, said end member assembly secured across said first end of said flexible spring member such that a substantially fluid-tight seal is formed therewith, and said end member secured across said second end of said flexible spring member such that a substantially fluid-tight seal is formed therewith.

20. A suspension system comprising:

a pressurized gas system that includes a pressurized gas source and a control device; and, at least one gas spring assembly according to claim 19, said at least one gas spring assembly disposed in fluid communication with said pressurized gas source through said control device such that pressurized gas can be selectively transferred into and out of at least said spring chamber of said at least one gas spring assembly.

* * * * *